(12) United States Patent
Gamble, III

(10) Patent No.: US 7,228,286 B1
(45) Date of Patent: Jun. 5, 2007

(54) MARKET SYSTEM AND METHOD FOR PROMOTION OF INNOVATIONS TO EFFICIENT PUBLIC POLICY

(76) Inventor: James L. Gamble, III, 610 Stillwater Rd., Gibson Island, MD (US) 21056

(*) Notice: Subject to any disclaimer, the term of this patent is extended or adjusted under 35 U.S.C. 154(b) by 0 days.

(21) Appl. No.: 09/565,354

(22) Filed: May 5, 2000

Related U.S. Application Data

(60) Provisional application No. 60/132,836, filed on May 6, 1999.

(51) Int. Cl.
*G07G 1/14* (2006.01)
(52) U.S. Cl. ..................................................... 705/14
(58) Field of Classification Search ................. 705/12, 705/14, 26, 27, 35, 36, 37, 60, 80
See application file for complete search history.

(56) References Cited

U.S. PATENT DOCUMENTS

| | | | | |
|---|---|---|---|---|
| 6,112,188 | A * | 8/2000 | Hartnett | 705/35 |
| 6,243,691 | B1 * | 6/2001 | Fisher et al. | 705/37 |
| 2002/0087448 | A1 * | 7/2002 | Wilkinson | 705/36 |
| 2003/0195838 | A1 * | 10/2003 | Henley | 705/37 |
| 2004/0181436 | A1 * | 9/2004 | Lange | 705/4 |
| 2005/0203827 | A1 * | 9/2005 | Gamble | 705/37 |

FOREIGN PATENT DOCUMENTS

JP      20055018597    *   1/2005

\* cited by examiner

*Primary Examiner*—Elisca Pierre Eddy
(74) *Attorney, Agent, or Firm*—Ober / Kaler; Royal W. Craig

(57) ABSTRACT

A public policy auction system for providing a monetary incentive for the adaption of efficient public policies. The system generally comprises a series of hierarchical negotiations and auctions for the proprietary right to receive a portion of the savings generated from the efficiency of a given public policy. The method begins with a registration phase during which information is collected on the proponents of new public policies, and shares are established for a portion of the approximate distribution of savings gained by implementation of the efficient public policy. The shares are auctioned to potential constituents during an active auction. The active auction method includes penalties to force constituents to combine and pool their bids, thereby encouraging cooperation and minimizing frivolous bids. The active auction is complemented by an innovator auction in which a predetermined number of policy innovators are selected to become competing bidders, and a predetermined interval of time is established before additional innovators may participate. The initial innovators negotiate a share of research and development expense to be borne by subsequent innovators, and all subsequent innovators are required to pay their share to the existing group. Potential subscribers to the policy may bid, and if the buyer accepts the innovator's bid, the subscriber is charged the amount of the bid. The winning buyer must try to provide an acceptable profit to the competing innovators at the lowest price for the government or penalties are imposed. The entire system is administered over the internet by a series of software modules. The net result is the creation of a free market for the savings gained by more efficient public policies, the market giving an incentive for the research and development of new efficient public policies and allowing the public and the innovator to sharing the resulting economic benefit.

14 Claims, 26 Drawing Sheets

MARKET SYSTEM AND METHOD FOR PROMOTION OF INNOVATIONS TO EFFICIENT PUBLIC POLICY

CROSS REFERENCE TO RELATED INVENTIONS

The present application derives priority from provisional patent application Ser. No. 60/132,836, filed May 6, 1999.

FIELD OF THE INVENTION

The present invention relates in general to a multiple computer system and method for implementing a public policy auction system designed to provide a monetary incentive for the adaption of efficient public policies. More particularly, an online auction or an interrelated, communicating system of online auctions is implemented that valuate the benefit of public policy innovations and assign rights in those innovations among innovators of the public policy, and constituents who support the policy.

BACKGROUND OF THE INVENTION

Since wars, alcoholism, drug addiction, corruption, unemployment, etc. are all inefficient conditions that waste resources. The inefficient use of resources causes numerous ills not the least of which is global warming. Plainly there is a great need to solve any of these enormous problems. A solution could save millions of lives, make the world a safer place, and possibly change the course of history. The advent of the internet provides a platform and present invention provides an auction exchange system of incentives to solve these problems. The prior art reflects a number of electronic commerce systems inclusive of auctions, but none so ambitious as to promote efficient public policy and the world's social welfare.

1. Systems and Methods for Electronic Commerce

The prior art is replete with descriptions of electronic systems and methods that facilitate the transfer of traditional goods and services. In an online context, U.S. Pat. No. 5,285,383 entitled Method for Carrying Out Transactions Using Electronic Title, and U.S. Pat. No. 5,297,031 entitled Method and Apparatus for Order Management By Market Brokers, describe means of displaying merchandise for sale to a plurality of customers connected to a server computer and means of conducting sales and order transaction. These references are directed to goods and services that presently have an analogue outside of the online context, such as the sale of cars, of clothing, of memorabilia, or of financial products.

2. Systems and Methods for Electronic Auctions

A comprehensive description of the advantages of electronic auction systems and methods over traditional live auctions is presented in U.S. Pat. No. 5,835,896 to Fisher et al., and will only be summarized here. Electronic auctions do not require the bidders, the auctioneer, the seller, or the merchandise to travel to the same location. The auctioneer can be a computer system instead of a person. Any number of auctions can occur simultaneously, limited only by computing power and communications bandwidth. Merchandise becomes available to a greater number of buyers, increasing their collective influence on price while decreasing transaction costs for the seller. Again, these references only disclose the transfer of conventional goods and services.

3. Systems and Methods for Electronic Collaboration

References that expand upon prior art electronic commerce and electronic auction systems and methods are also found in the prior art. By way of example, U.S. Pat. No. 5,794,219 to Brown describes an online auction that permits individual bidders to pool bids during a bidding session. Bidding groups and their constituent members are registered in the server computer. Total bids for all members of the bidding group are compared to find the winning bidder. The present invention disclosed herein is a closer cousin to these references, yet still distinct from them.

In all of the prior art references noted and in the current state of the art, no systems and methods are described that evaluate and capture the economic benefit of innovations in policy, as conceived and expressed by innovators. Despite the intangible nature of such an enterprise, there is nothing to prevent the use of electronic systems and methods to do so.

By way of example in the greater portion of the economy, the relative uniqueness of an individual's contribution and the contribution of an individual's resources are the standard of fairness in market economies. The uniqueness of an individual's contribution and the contribution of an individual's resources is referred to here as the unique marginal revenue product. In a traditional patent system, because the unique marginal revenue product is not the standard of fairness and a 20 year exclusive grant is the standard of fairness, inefficiencies result. One reason for inefficiencies is because a competing innovator may only be minutes ahead of the competition, but receives patent protection for only 20 years. Inefficiencies also arise when an individual whose contribution is truly unique might only get 20 years of protection, when that individual may be 30 or 50 years ahead of their competition. As a result, they do not get adequate reimbursement. Inadequate reimbursement is inefficient because it fails to provide the profit signals defining the importance of unique and valuable contributions. There are no proprietary rights for those who develop good policy.

By way of a more specific example, let us suppose that an economist sees that the auctioning of airwaves could bring in $3 billion per year to the U.S. treasury. As an innovator, he takes the concept to an exchange comprising an interrelated set of policy auctions. The exchange has an auction for constituents and several levels of auctions for special interest groups. The constituents bid an average of 0.00033 of the savings or $100,000 apiece, and the special interest groups at the primary, general and floor auction level bid an average of $40,000 apiece or 0.000133 of the saving from the efficient policy. If we assume that there are 350 members of Congress, but only 175 are necessary to achieve a majority, then it would take $175 million for the constituents and $21 million for the special interest groups to save the government $3 billion. Since another economist could probably have figured out the benefits in one month, the economist would only get $1/12$th of the savings or $250 million and the tax payers would get $2.5 billion, instead of none, of the $3 billion in savings.

Let us assume that a politician who is reluctant to support an efficient public policy is necessary to achieve a majority for that policy. The lowest bidding constituents, and special interest groups for the primary and general election auctions would be placing enormous pressures on their lowest bidders in inferior auctions to pressure the politician to support the efficient public policy. If the lowest bidder in the primary bid $40,000 and the next highest bidder bid $60,000, then the first lowest bidder would be penalized to $16,000 with the formula and the lowest bid would now be $76,000 for the district, threatening the innovator's profit on the low bidder's bid.

SUMMARY OF THE INVENTION

It is a primary object of the present invention to combine advantageous aspects of electronic auction systems and methods, and collaborative electronic systems and methods, in a novel way to valuate and assign innovations in public policy. In this context, government is treated as a technology. Public policy undergoes scientific evaluation, analogous to the scientific evaluation performed by pharmaceutical companies in the development of new medicines. This scientific evaluation involves research and development costs. As a result, the public policy innovator needs proprietary rights to protect the processes and methods of those policies.

It is a further object of the present invention to replicate closely competitive forces and incentives between buyers and sellers through the use of an electronic verification and auction system for innovators. Such an auction between two or more innovators would be useful for valuating proprietary rights in an efficient public policy, in a preferred embodiment of the present invention. If the commodity of the electronic verification and auction system is an efficient public policy, its cost is the unique marginal revenue product of the innovator for the innovation.

It is a further object of the present invention to replicate competitive forces and incentives between buyers and sellers through the use of an electronic verification and auction system between competing innovators as the holders of proprietary rights in efficient public policy, and outside parties wishing to implement the efficient public policy, including but not limited to special interest groups, governmental bodies, and individuals. The present invention may also be used to sustain existing and future effective public policies, without the entry of innovators.

The above and other objects are fulfilled through a public policy auction system and method designed to provide a monetary incentive for the adaption of efficient public policies. The system generally comprises a series of negotiations and auctions for the proprietary right to receive a portion of the savings generated from the efficiency of a given public policy. The method begins with a registration phase during which information is collected on the proponents of new public policies and is keyed into a central auction computer. Using conciliation and arbitration based on previous publications, the initial innovators with various insights determine their relative share of the proprietary rights.

Once ownership distribution and the approximate savings for of the initial innovators is established, the program starts an active auction for constituents.

The active auction defines interests in the savings developed from the implementation of the more efficient public policy. To win the auction, the bid from the lowest bidding constituent must meet the following conditions: (1) it is the lowest bid in a politician's district or have combined with the lowest bidder, either voluntarily or through penalties; (2) the low bidder's politician must support the policy, (3) the public policy must be enacted and enforced, and (4) the low bidder's representing politician must be in the smallest group of legislators necessary to pass the legislation, who represent the lowest bidders, including their combined and penalized bidders.

Because a politician will probably not respond to a single individual, the method includes steps to force constituents to combine through a series of small, but cumulative penalties, which should encourage cooperation among an expanding pool of supporting constituents. The system allows constituents to avoid the penalties through pooling their bids. A penalty is imposed on the lowest bidders from the same district, but from inferior auctions, for failing to gain the support of their politician for an efficient public policy. For example, the innovator will be able to penalize the lowest bidder if the bidder's representing politician fails to support the policy in a committee vote. Penalties, combinations and the threat of future penalties should encourage urgency and hopefully encourage cooperation, while minimizing frivolous bids by those without political clout.

The active auction has sub-auctions during the general and primary elections, which require contributions to participate. The requirement should encourage constituents to contribute to candidates who advocate efficient public policy. The active auction, therefore, creates grass roots support for the efficient public policy.

If evidence exists, for example, from publications published before the initial innovator's publications to show that another innovator probably would have developed the efficient public policy at within a given interval after the initial innovator, the innovators may negotiate or arbitrate this interval. After the interval has elapsed the innovator can enter into an innovator auction that includes between two to thirty innovators and several buyers, who act as surrogates for the government. For a buyer to win the innovator auction, they must be among the lowest bidders, who will serve as buyer surrogate in the hiring auction used to select them, and then obtain the lowest total of bids from the competing innovators over a series of serial auction periods. For the innovators to win, they must have had their bid or bids accepted by the winning surrogate buyer. They win the total of their accepted bids by the winning buyer. Before the innovator auction, a predetermined number of these surrogates are selected to become competing buyers, and a negotiated or arbitrated interval of time is established before additional innovators may participate based on research published prior to the description of the policy. The initial innovators also negotiate a share of research and development expense to be borne by subsequent innovators. All subsequent innovators are required to pay the share to the existing group as a condition precedent to participating. The innovators, who developed and would have developed the efficient public policy, would then bid hoping that the buyer will accept his or her bid representing a time period in an interval. If the buyer accepts the innovator's bid in an interval, the subscriber is charged the amount of the bid. If a bidder wins too many predetermined consecutive bids for the interval period, that bidder can not bid for a period. If another bidder does not bid, the subscriber is charged a penalty, calculated as a portion of the public policy savings that would have been gained for the time period.

If one innovator withdraws, the buyer can be charged monopoly rates for the period. Given the risks of monopolies or virtual loss of the policy savings, the winning buyer must try to provide an acceptable profit to both of the competing innovators at the lowest price for the government.

The system is administered by software that includes three sets or modules. One set of software guides the innovator through the system. This portion of the program is designed to explain to the innovator how to utilize the system. Another set of software develops an auction process for constituents with reimbursement to encourage political support and passage of the innovator's efficient public policy. The last set of software attempts to create an auction system and maintain a competitive market with a market price for innovators when there are only a few bidders and the government, and after the initial innovator's monopoly has expired. This last software might also be useful for developing a market price for contracts, when there are few bidders.

The innovator guide index connects the innovator to sites that explains procedure and concepts like the initial contact through registration, verification of the efficiency of public policy, like the granting of preliminary intellectual property rights, like experimentation, like the granting of monopolistic intellectual property rights, like how to handle competitors, like the duration of intellectual property rights, like a valuation of innovators who improve innovations, like the handling of disputes with government over the duration of monopolistic intellectual property rights, like the initiation of a special interest group auction to support legislation, like collections and a process to develop a market value for competing innovators, called the innovator auction.

For the purposes of the disclosure of the present invention, efficient public policy is defined as a public policy that provides consumers and taxpayers as consumers the greatest total measurable, reasonably estimated benefit for the least cost. A bidder is an individual by himself an individual chosen by a special interest or other group to bid. An innovator is the inventor of an efficient public policy. Public policy is defined as any concept that can be applied to a rule-based process, including but not limited to: a law, a regulation, an administrative rule, a rule of order or procedure, a compromise or settlement, an itinerary or schedule, or an agenda. The term public for purposes of the present invention is not limited to the ordinary sense of the term, but includes any community or subset of the general public that is of sufficient size to benefit from the advantages of the present invention. The term politician includes any political representative of the public or subset of the general public that has the authority to represents their constituents by voting for adoption of a public policy. The term district can mean a political voting district, legislative seat, or individual legislator.

Further, for the purposes of the disclosure of the present invention, an auction is defined as any bidding process, it can be open or closed, up or down. The bids are for a portion of the savings gained from an efficient public policy or for a portion of some commodity. Registration consists of opening new accounts, getting addresses, verifying that voters are registered in their districts, keying in this information in the central auction computer. It also refers to the keying in the name and district and house seat of the politician. An exchange is defined as the computer program the drives the auction and the enterprise that owns the program. A special interest group is one or more persons who can influence a politician to support a policy. A special interest group is not limited to the ordinary sense of the term, but can include a trade union, a professional group, or an individual.

BRIEF DESCRIPTION OF THE DRAWINGS

The objects, features, and advantages of the present invention will become more apparent from the following detailed description of preferred embodiments thereof, in conjunction with the accompanying drawings, in which.

DETAILED DESCRIPTION OF THE INVENTION

Figure 1:
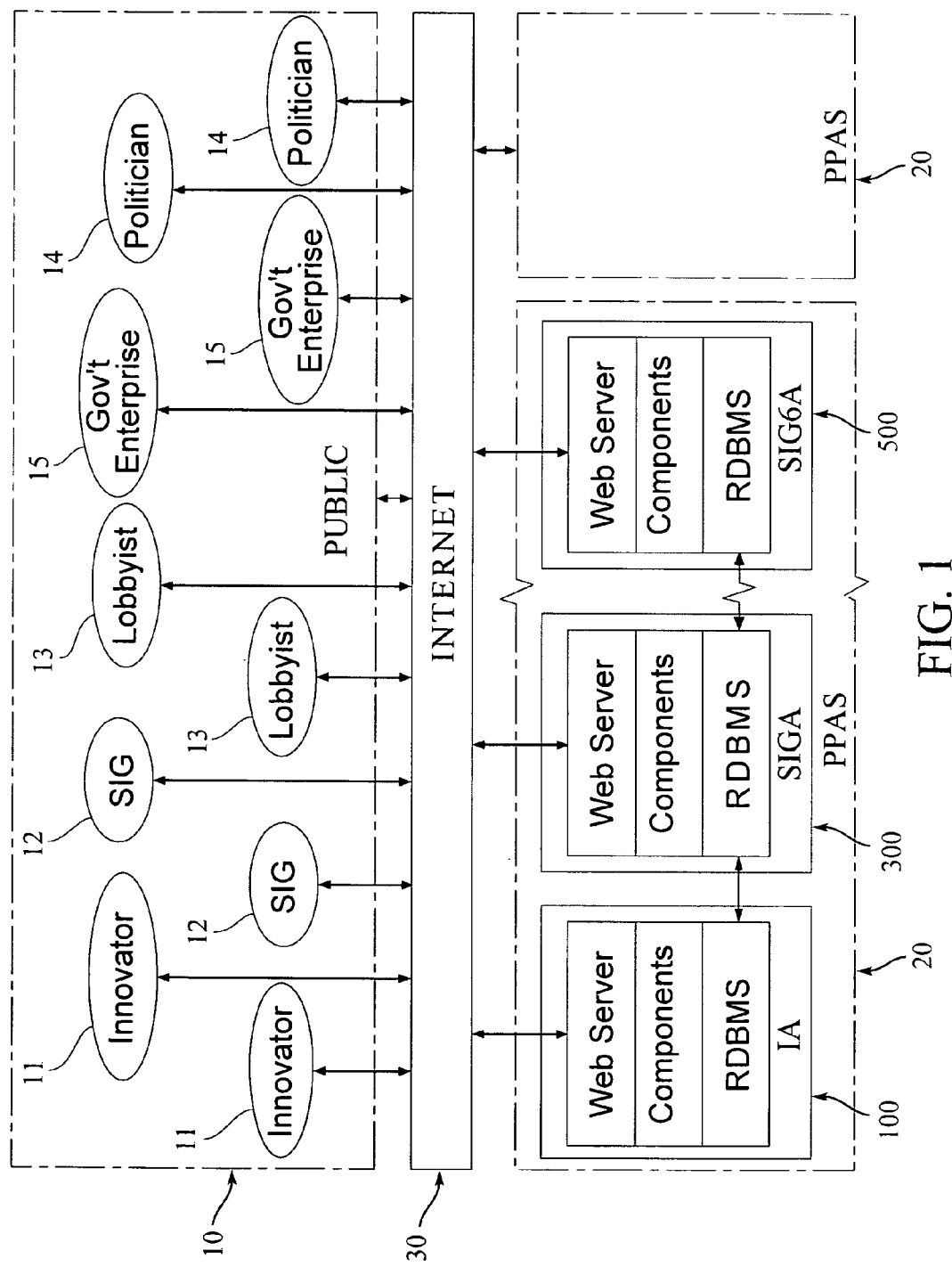
FIG. 1 is a schematic of an exemplary multiple computer system apparatus in which the present invention can be practiced.

Before the present system and method for quantifying and redistributing the marginal revenue product of public policy innovations is described, it is to be understood that this invention is not limited to a particular intangible commodity or to a specific method or system. It is also to be understood that the terminology used herein is for the purpose of describing particular embodiments only. Further, unless defined otherwise, all terms used herein have the same meaning as commonly understood by one of ordinary skill in the art to which this invention belongs.

1. General Structure of the Auction Methods

In any of the class of embodiments detailed below, a public policy auction system and method will comprise a hierarchical series of auctions for the proprietary right to a portion of the savings generated from the efficiency of the public policy. Specifically, a "lobbyist auction" method is superior to a "primary auction" method; both the lobbyist auction method and the primary auction method are superior to a "general auction" method, and all of the above auction methods are superior to "committee" and "floor auction" methods. Constituents and special interest groups from a district who support candidates during primary and general elections and who are the lowest bidders in their district in their superior auction have the right to penalize the lowest bidders from the same district, but from inferior auctions, for failing to gain the support of the politician for an efficient public policy and the right to combine them with the next lowest bidder. The penalty is an action taken by the lowest bidder of a superior auction to reduce the bid of the lowest bidder in the next active inferior auction, when the lowest bidder fails to gain the support of the politician for the efficient public policy. For example, the constituents for a politician's district will be able to penalize the lowest bidders from the active primary election auctions for that district, if the elected politician fails to support the policy before committee votes, (and if the candidate is elected and serves on a committee that determines the fate of a bill) and before floor votes. In a similar example, 1) the lowest bidders in the primary level auction will be able to penalize and combine special interest groups, who are the lowest bidders in the active general election level auction, 2) the lowest bidders in the general election auctions will be able to penalize and combine special interest groups bidding in the committee and floor level auctions and 3) the innovators can penalize the lowest bidding lobbyist, if the innovator activates the lobbyist auction. These combinations are done with a formula that penalizes and adjusts for the number of members in the special interest group. The penalizing and combining can be done repeatedly until the constituents or special interest groups at a level are exhausted, or the politician commits support to the policy. Penalties, combinations and the threat of future penalties should encourage competition and hopefully encourage cooperation, while minimizing frivolous bids by those without political clout.

In addition to the competition to be the lowest bidder within a district, there is also, be competition between districts because only the lowest intradistrict bidders, whose politicians supported the efficient public policy and whose politicians were necessary to reach a minimum majority would receive their bids. Bidders from superior auctions may undergo a verification of this process. The bidders from superior auctions would only receive their bids, if their politician supported the efficient public policy and if the sum of their bid and the bids of the lowest bidders from inferior auctions for their district was among the lowest sums of competing bidders from superior auctions, whose politicians were the minimum necessary to achieve a majority for a committee or floor vote. There will, also, be auctions for towns or special interest groups to have towns become experimental subjects for efficient public policy development.

To win the right for a portion of the savings or for a monetary payment the government enterprise buyer in the innovator auction must be among the lowest bidders to obtain the right to represent the government enterprise and must obtain the lowest net bids from the innovators during the innovator auction. To win the right to what is in the present class of embodiments, a proportion of the savings from the efficient public policy, the innovator must have won some of the bids for the innovator auction.

2. The System

FIG. 1 is a schematic of an exemplary multiple computer system apparatus in which the present invention can be practiced. Users, comprising one or more innovators 11, one or more special interest groups 12, their constituent or pooled constituents 13, one or more politicians 14, and one or more government enterprises 15, interface the public policy auction system 20 over a common data communications system 30 such as the Internet. The public 10 may also access the public policy auction system 20 for the purpose of observing the process. The public policy auction system 20 further comprises one or more implementations of an innovator auction method 100, one or more implementations of a special interest group auction method 300, and one or more implementations of a special interest group summing auction method 500. There is no practical limit on the number of simultaneous public policy auction systems 20 in use at any one time.

3. Innovator Auction Method

The purpose of the innovator auction is to replicate competitive forces and incentives between buyers and sellers, when a small numbers of either or both buyers and sellers would cause the market to crash or go to monopolistic levels after the initial innovator's monopoly interval ends. This method is particularly useful for intellectual property rights for efficient public policy, when a government might have an auction between two innovators. The problem with a small market, assuming two bidders, is that the bidders can bid so low that they have no chance of overcoming their costs. Consequently, the market crashes and both buyers and sellers get nothing. To prevent market crash, the innovator auction penalizes the buyer with the total costs lost for the period, including producer and consumer surpluses, if the product is not utilized. If the product is efficient public policy, then the total cost is the total savings created from the efficient public policy for the period. In another scenerio, one bidder drops out and the other bidder can drive the buyer's costs to monopoly levels. Monopolies are created by discouraging the competition with predatory prices, which are below costs, until the competitions dies and then later monopolistic pricing. To prevent long term predatory pricing, as well as market crashing, the innovator auction prevents an innovator from bidding, if that bidder wins a number of consecutive bids, to give the other bidder a chance to recover their costs and to penalize the buyer from failing to maintain a long term market that would have some resemblance to a competitive market equilibrium. In addition, to replicate markets and ensure the lowest costs, several buyers need to compete to obtain the lowest costs winning In one preferred embodiment of the innovator auction, an innovator auction method 100 is implemented as a computer application with three tiers: (1) a thin client front end in the form of an Internet World Wide Web (WWW) site, (2) relational database management system (RDBMS) back end of the type prevalent in the art and commercially available, and (3) a middle tier cooperating with the WWW front end and the RDBMS back end. The middle tier contains the operative code that performs the method of the present embodiment.

Figure 2:
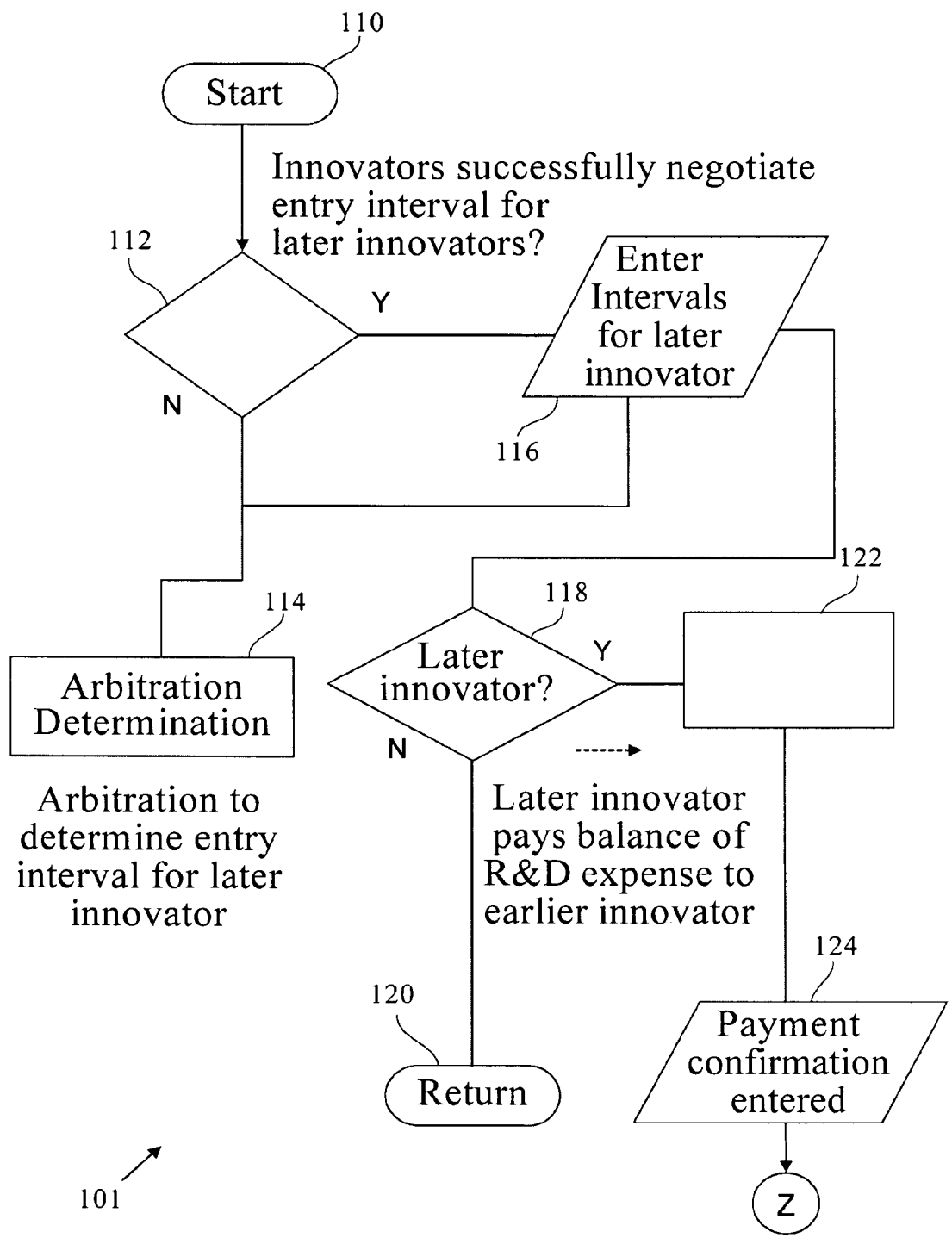
FIG. 2 is a chart depicting the entry interval negotiation method 101 supporting the innovator auction method 100 of FIGS. 4 through 10.

Referring now to FIG. 2, at least one innovator encounters the entry interval negotiation method 101 at the start of the front end client in step 110. In step 112, innovators attempt to negotiate an appropriate entry interval (the interval of time before the next researching innovator can enter the market) for future innovators. The months of the duration of the entry intervals(s) are keyed in and stored for each innovator, and the extra amount of the research and development expenses are keyed in. Following this, the share of the research and development expenses that needs to be paid by the later researching innovators is calculated as follows.

If E=expenses and n=the number of the sequence in which that innovator would have discovered the solution, then the nth innovator would pay=$E \times ([1/(n-1)]-[1/n])$ If unsuccessful, an arbitration is conducted in step 114. The result of either negotiation in step 112 or arbitration in step 114 is entered in step 116. If there are no new innovators, the process restarts in step 120.

Newly entering innovators must pay the balance of research and development, capital, risk, and legal expenses to earlier innovators in step 122, in order to gain entry into the innovator auction. When the payment is received it is keyed in. At weekly to yearly intervals, the computer checks to see if the calculated payment payments for research and development cost had been paid and the date was one month to one year prior to the initial (appropriate) entry interval. Once proper payments are confirmed in step 124, the innovators enter the innovator auction at step 164.

Figure 3:
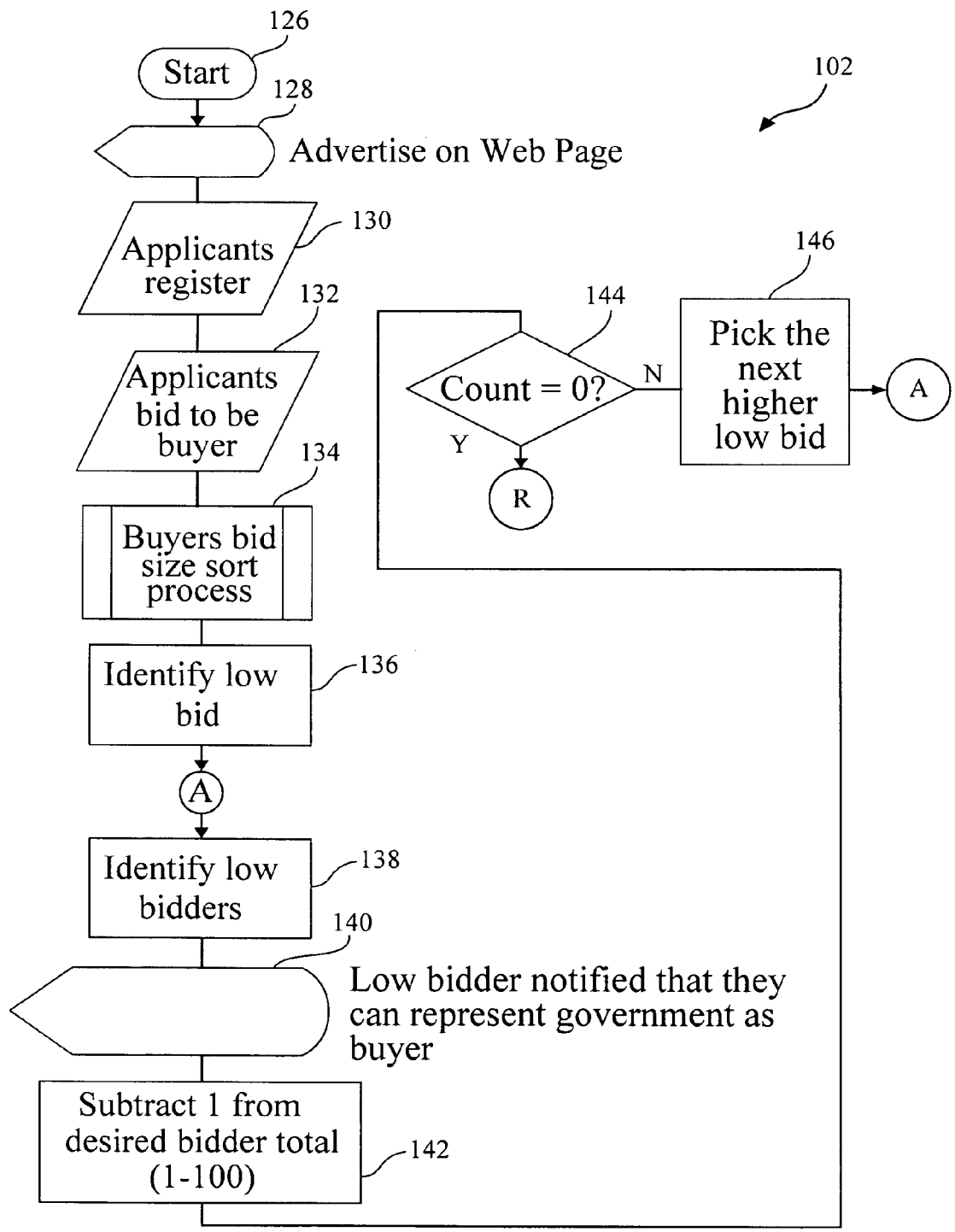
FIG. 3 is a chart depicting the buyer auction method 102 supporting the innovator auction method 100 of FIGS. 4 through 10.

In FIG. 3, applicants encounter the buyer auction method 102 at the start of the front end client in step 126. The applicants advertise in step 128, register in step 130, and bid to be the buyer in the innovator auction in step 132. The bids of the buyers are sorted in step 134, the lowest bid is identified in step 136, and the lowest bidder in step 138. The low bidder is notified in step 140 that entry into the innovator auction has been granted. This process is repeated in steps 142, 144, and 146 until the desired number of buyers gain entry into the innovator auction at step 168. The lowest bidding buyers up to the desired number (e.g., 2 to 100) may be selected through a counting process.

Figure 4:
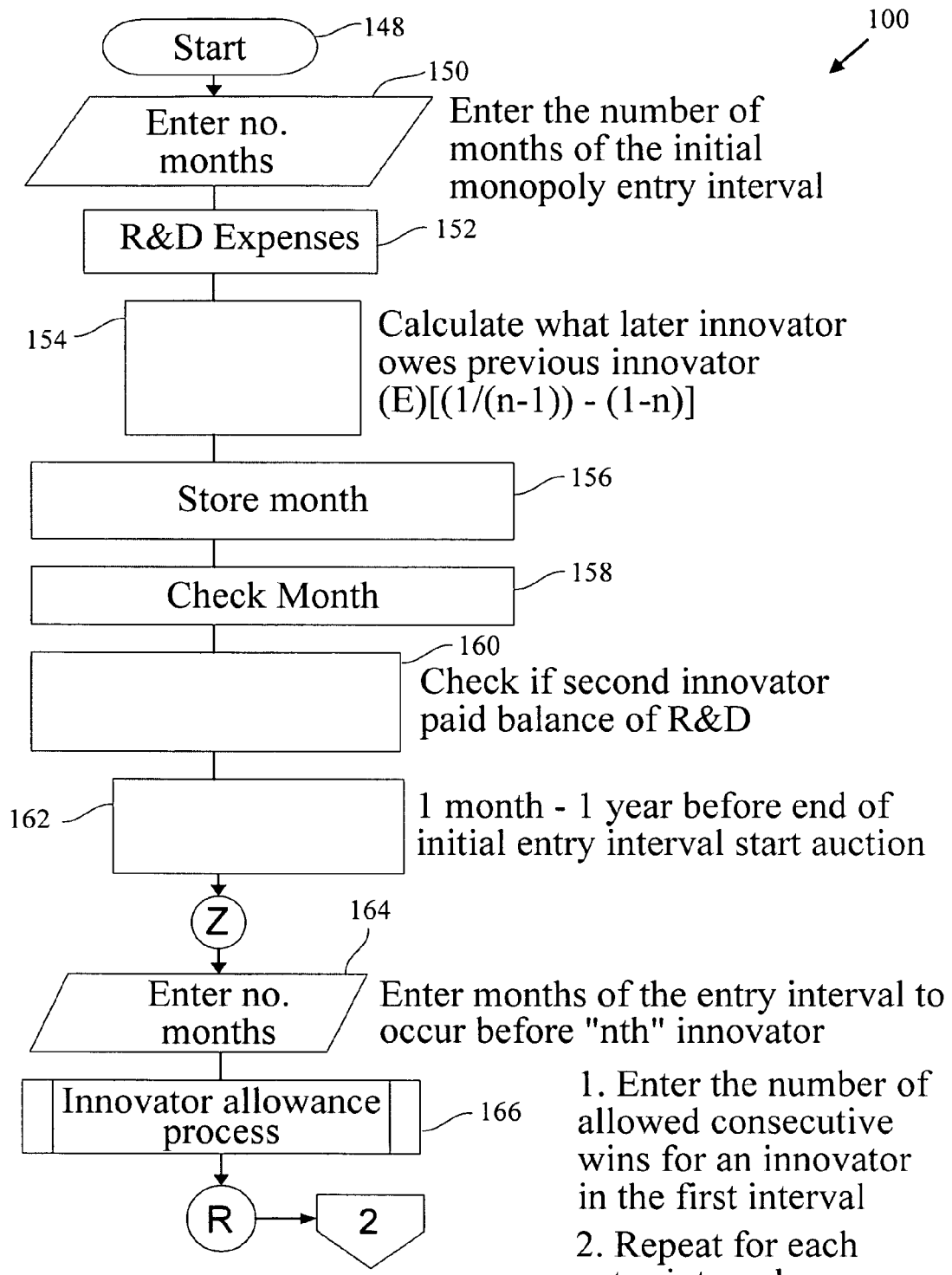
FIGS. 4 through 10 are charts depicting an innovator auction method 100, according to a preferred embodiment of the present invention.

FIGS. 4 through 10 chart the innovator auction method 100, that innovators gain entry to from the entry interval negotiation method 101, and buyers from the buyer auction method 102. In FIG. 4, the method is initiated in step 148 by an exchange employee (an employee of the company running the program) prior to the entry of innovators or buyers. The initial entry interval is entered in step 150 and research and development expenses for the interval are calculated in step 152. Later entering innovators owe earlier innovators a portion of those expenses which are calculated in step 154. The month is stored in step 156 and checked in step 158. The later innovator's payment is verified in step 160, and the process pause until one month to one year before the end of the entry interval auction method in step 162. In step 164 the entry interval is entered and in step 166, an innovator allowance process is conducted.

Figure 5:
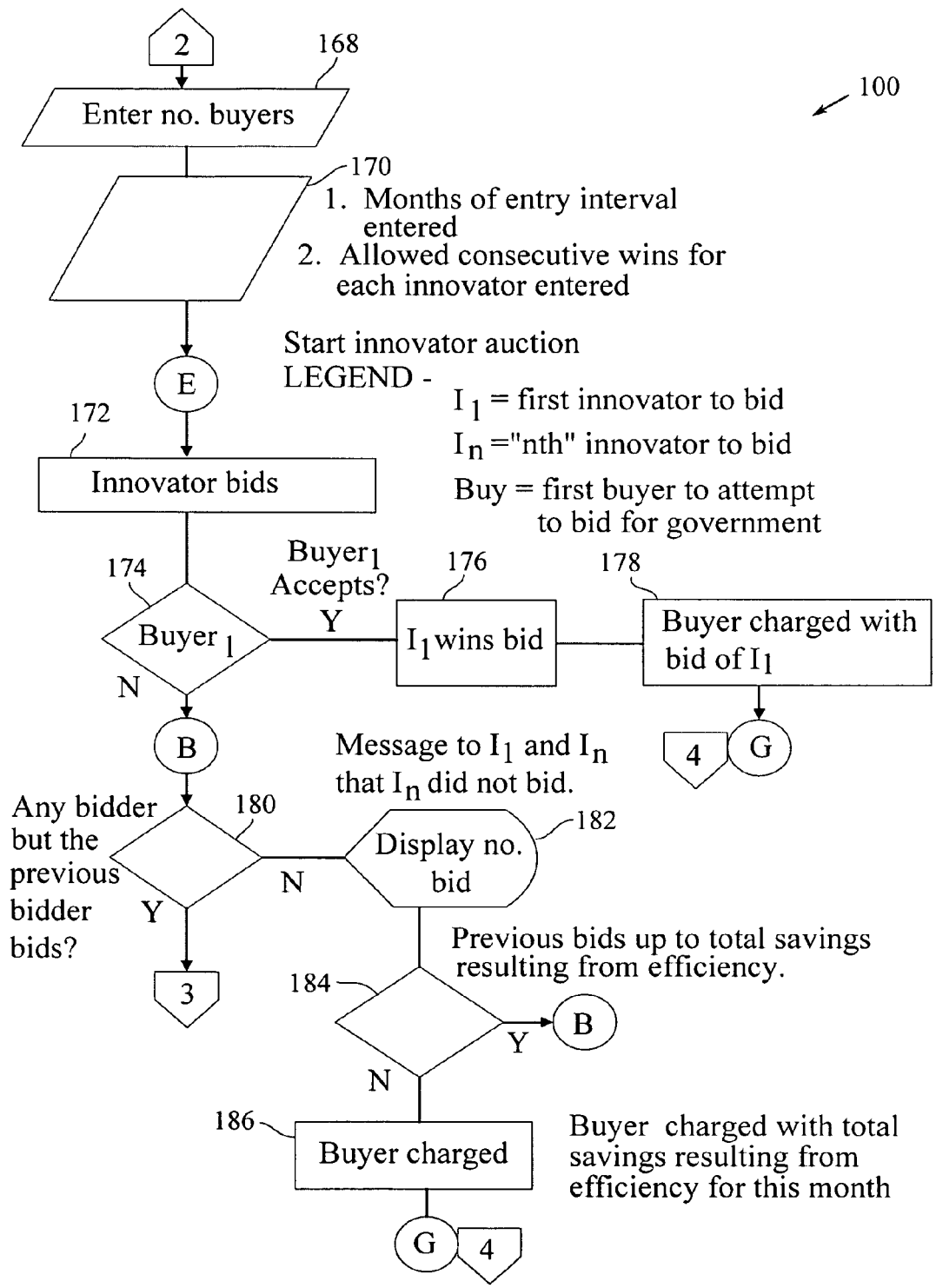
Figure 6:
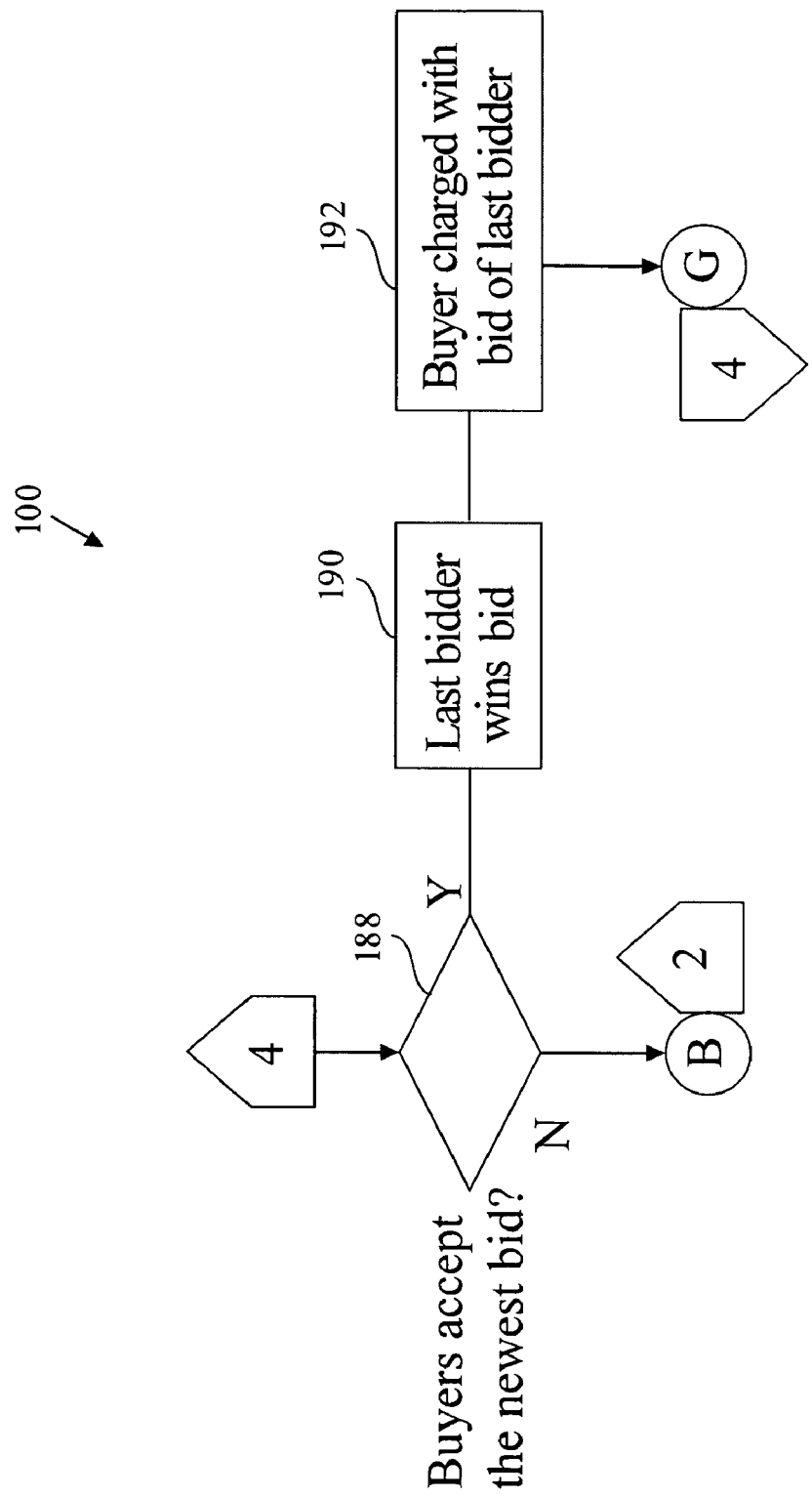

In FIG. 5, the preselected number of buyers is entered in step 168, and the entry interval and allowed consecutive winning bids is entered in step 170. The heart of the innovator auction method 100 then begins when the first innovator bids in step 172. If the first buyer accepts this bid in step 174, said innovator wins in step 176, and said buyer is charged in step 178 before moving forward in the method to step 194. If said first buyer does not accept, and if no other bid is found in step 180, the resultant no bid state is published in step 182. If after the no bid state the previous bids do not exceed the total savings of the policy in step 184, the buyer is charged with the total savings in step 186 before moving forward to step 194. Referring now to FIG. 6, if there is another bid in step 180, and if the buyers accept this new bid in step 188, the last bidder wins in step 190, and the buyer is charged with the bid of the last bidder in step 192.

Figure 7:
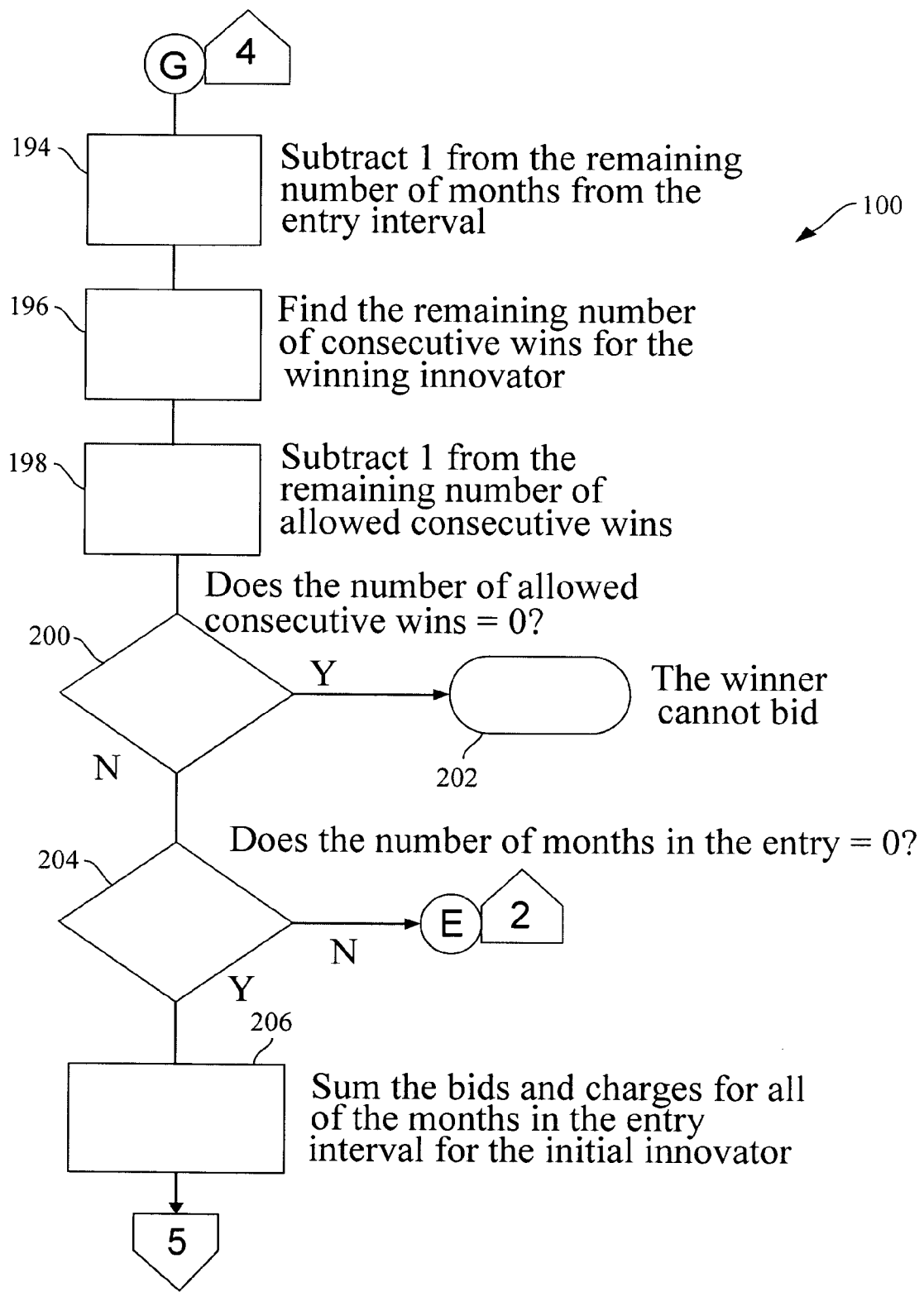

In FIG. 7, after the winning buyer is charged with the bid of the winning bidder, one time period (e.g., a month) is subtracted from the entry interval in step 194, and the remaining number of consecutive wins for the winning innovator is found in step 196 and reduced in step 198. Each buyer is allowed so many consecutive wins. If there are no more consecutive wins permitted in step 200, the winner is informed that no more bids will be allowed in step 202. If in step 204 there are remaining months in the interval, the bidding process begins again at step 172. If not, the bids and charges for all of the months in the entry interval for the initial innovator are totaled in step 206.

Figure 8:
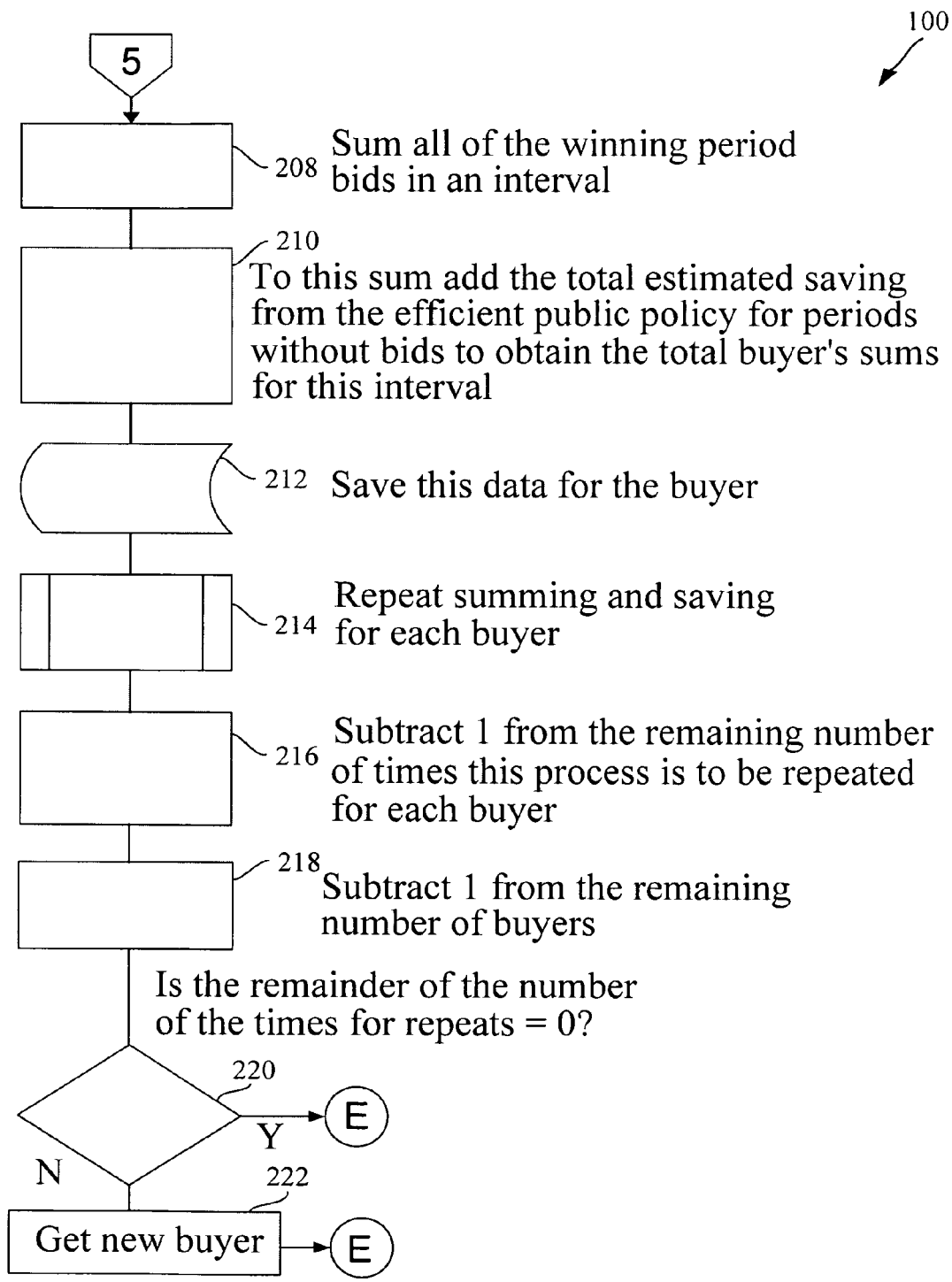

In FIG. 8, all the totals for all the winning bids in the interval in step 208 are added to the total estimated savings from the efficient public policies without bids in step 210. This information is stored for each buyer in steps 212 and 214. The number of processes remaining is reduced in step 216 and the remaining number of buyers is reduced in step 218. If there are more processes to be conducted in step 220, the process repeats after a new buyer is retrieved in step 222, before returning to the process at step 172.

Figure 9:
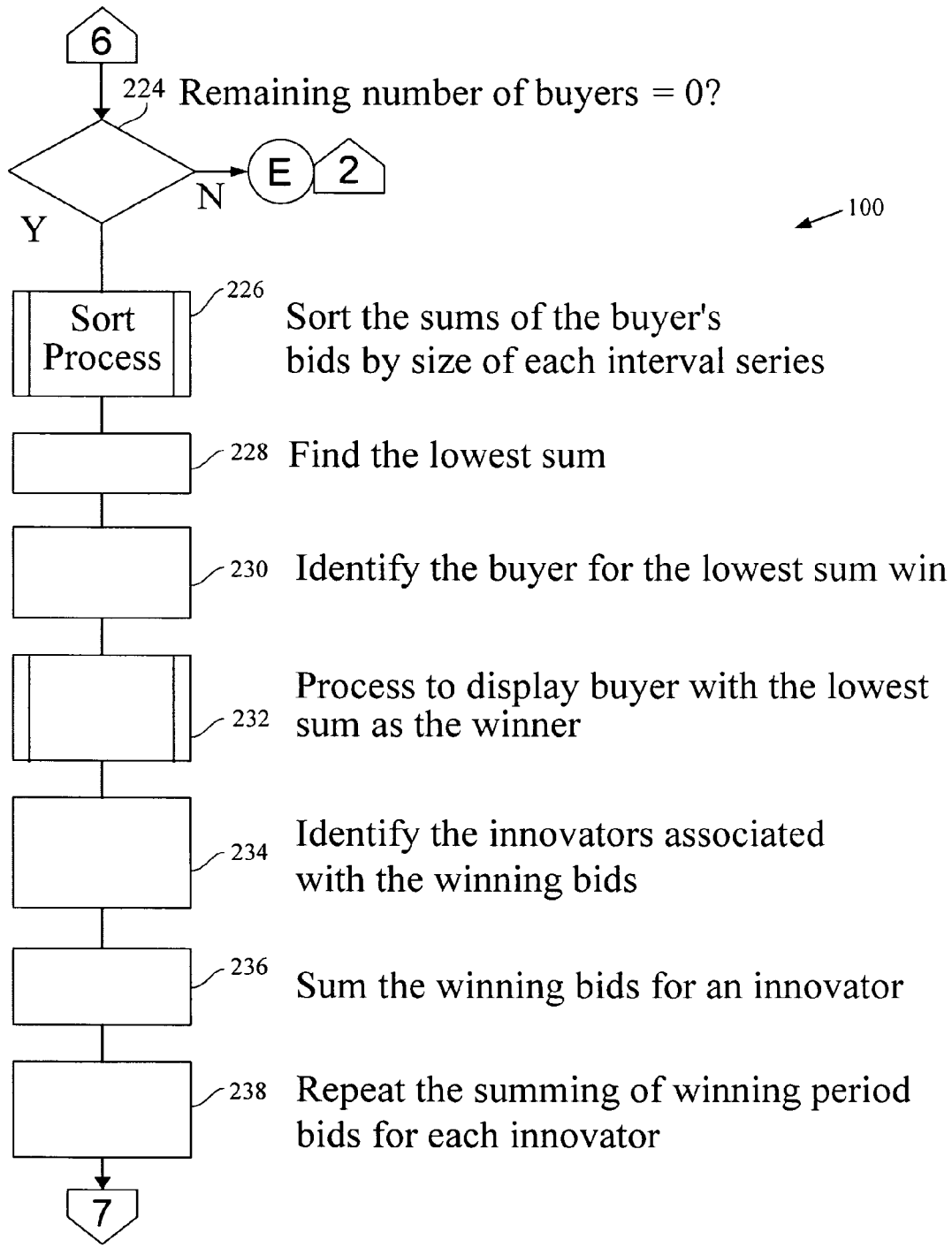
Figure 10:
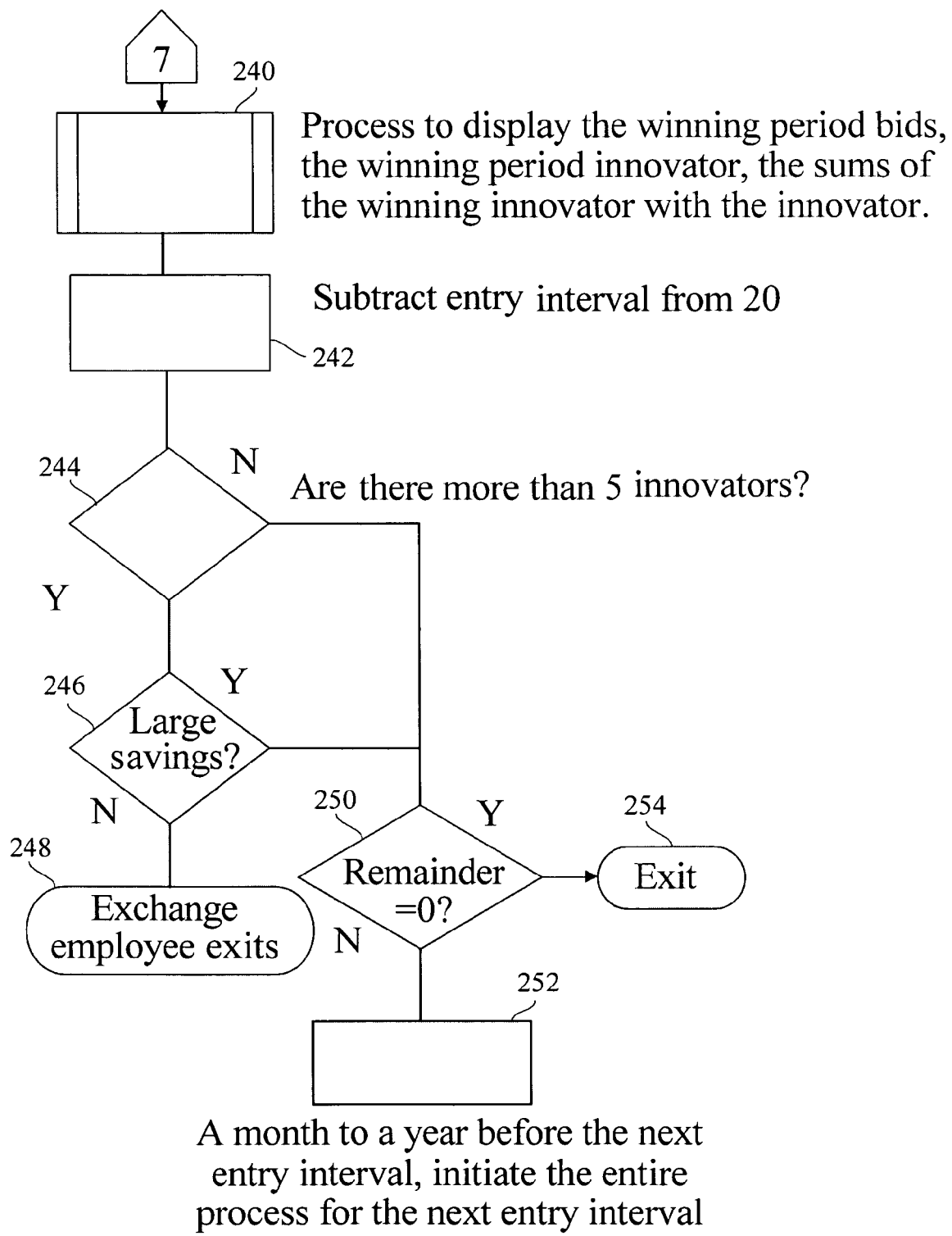

In FIG. 9, where there are more buyers at step 224, the process begins again at step 172. Otherwise, the bids of all buyers are sorted in step 226 and the lowest sum is found in step 228. The corresponding buyer is found in step 230 and displayed in step 232. The innovators associated with the winning bids are identified in step 234 and the winning bids for each innovator are summed in steps 236 and 238. Referring now to FIG. 10, the winning period bids, winning period innovator, and the sums of winning innovator bids are published in step 240. The number of entry intervals is reduced in step 242. If there are 5 or less innovators at step 244, or there are large savings in the proposed public policy innovations at step 246, and if there are no remaining intervals at step 250, the process is completed at step 254. Otherwise, the entire process is initiated again in step 252.

4. Special Interest Group Auction Method for Bidders in the Level Auctions

In a second preferred embodiment of the present invention, which may or may not be implemented in collaboration with the first preferred embodiment, a special interest group auction method 300 is implemented as a computer application with three tiers: (1) a thin client front end in the form of an Internet World Wide Web (WWW) site, (2) relational database management system (RDBMS) back end of the type prevalent in the art and commercially available, and (3) a middle tier cooperating with the WWW front end and the RDBMS back end. The middle tier contains components that replicate the methods of the present embodiment. Data in the RDBMS tier is shared or pooled with the data of the related auction methods.

Figure 11:
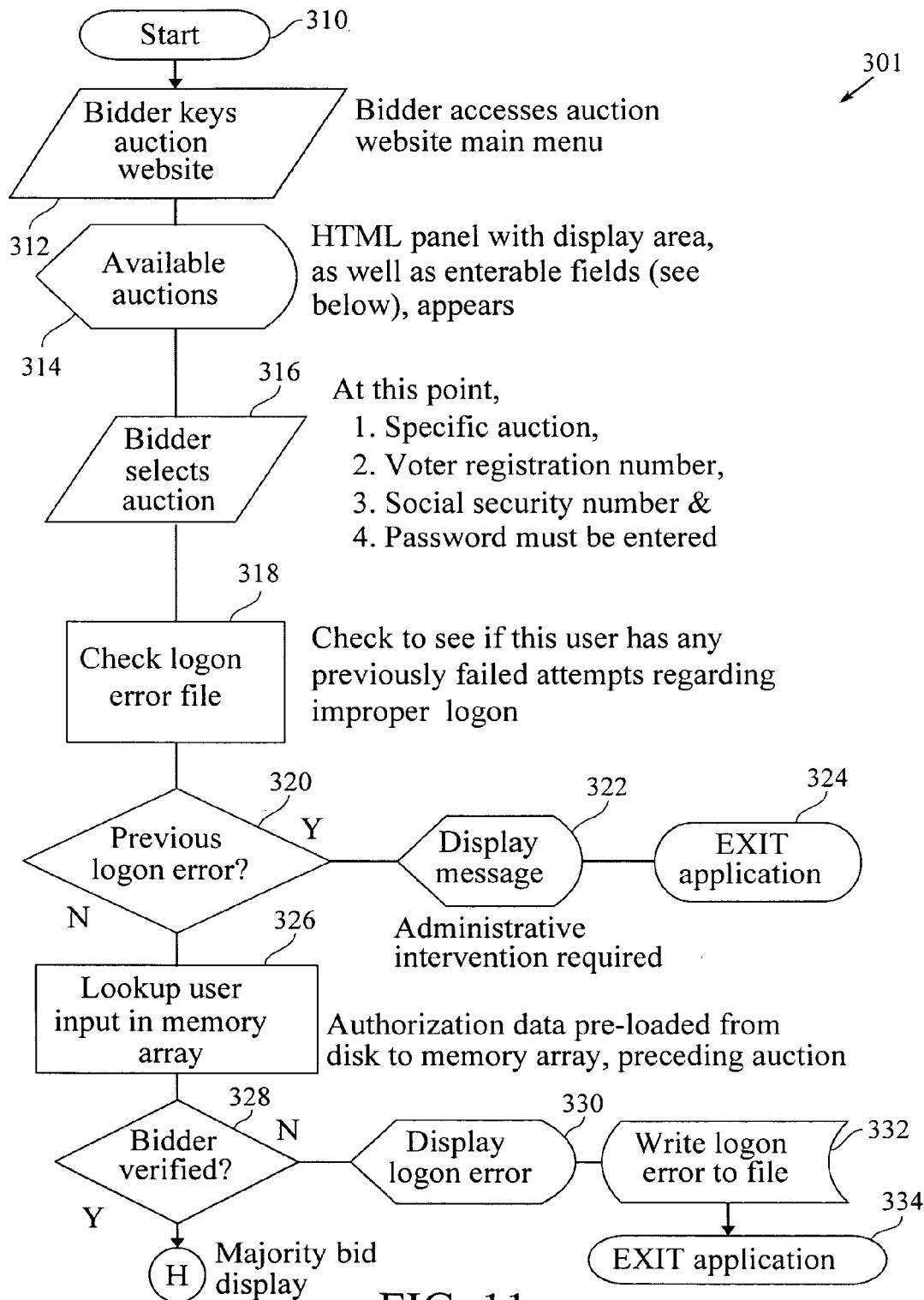
FIG. 11 is a chart depicting a bidder verification method 301 supporting the special interest group auction method 300 of FIGS. 12 through 18, or the special interest group summing auction method 500 of FIGS. 19 through 28.

In FIG. 11, bidders encounter a bidder verification method 301 supporting the special interest group auction method 300 of FIGS. 12 through 18 at step 310, and accesses the special interest group auction web site in step 312, where available auctions are published in step 314. The bidder selects an auction in step 316 and enters personal information. This information is checked in step 318 and if there was a previous error at step 320, an error display message is published in step 322 and the verification fails at step 324. If there is no error found at step 320, the bidder information is verified in step 326 and if verification is complete at step 328 then the bidder enters the special interest group auction. If verification fails, an error message is published in step 330, the error is recorded in step 332, and the verification terminates in step 334.

Figure 12:
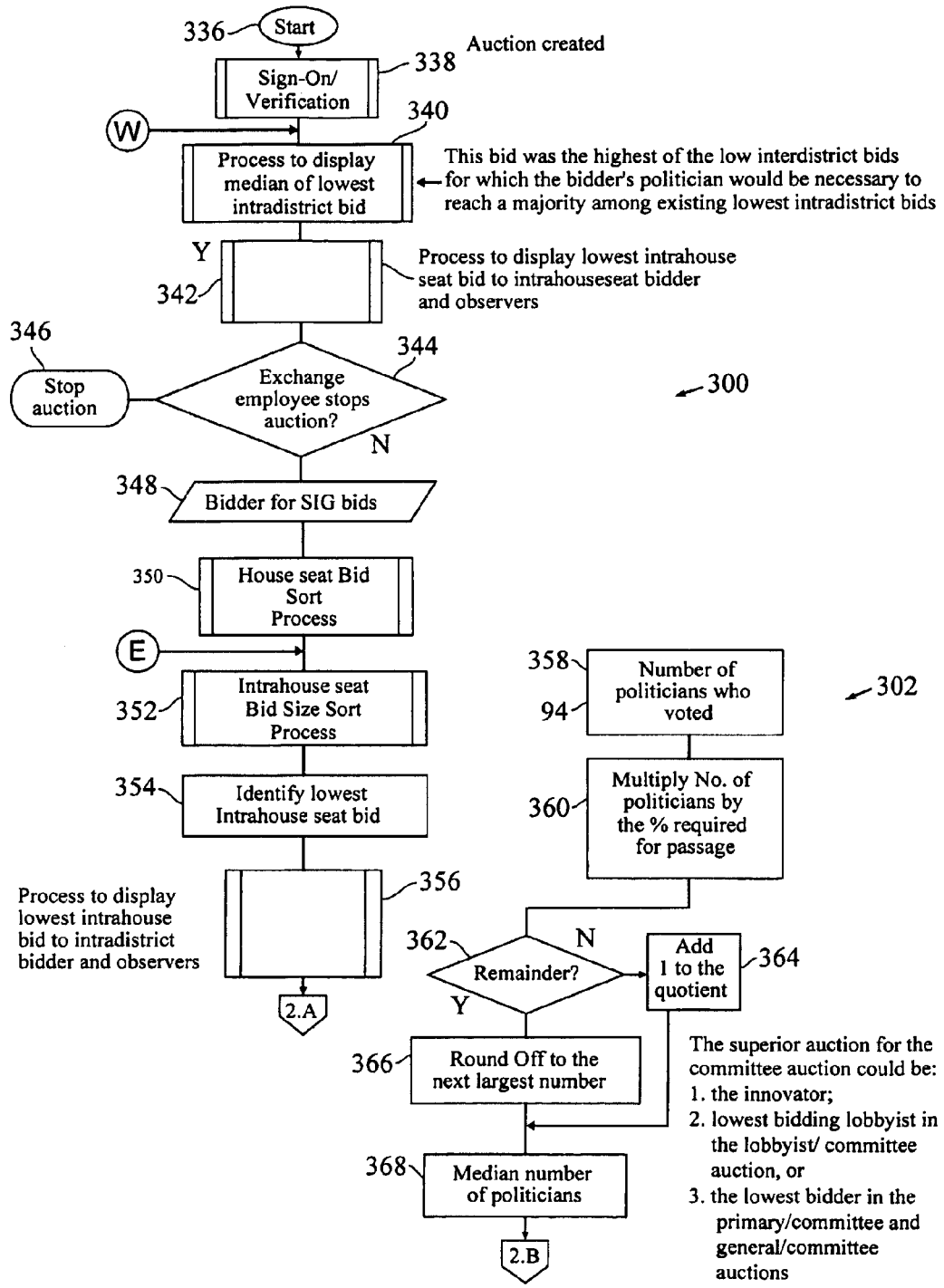
FIGS. 12 through 15 are charts depicting a first real time control process 302 and second real time control process 303 which comprises a special interest group auction method 300 for session level bidders during a legislative session before a floor or committee vote, according to a second preferred embodiment of the present invention.

FIGS. 12 through 15 are charts depicting a first real time control process 302 and second real time control process 303 which comprises a special interest group auction method 300 for session level bidders during a legislative session before a floor or committee vote, according to a second preferred embodiment of the present invention. The special interest group auction is for the bids of the special interest group bidder who are only in the auction for committee floor votes during the legislative session. Referring to FIG. 12, the special interest group auction method begins at step 336 and the bidder verification method 301 occurs at step 338. The median of the lowest intradistrict bids is displayed in step 340, and the lowest intradistrict bid is published to the bidder and observers in step 342. If an exchange employee does not stop the auction at steps 344 and 346 before a legislative vote, the bidder for a special interest group bids in step 348. The district bids are sorted in step 350 and the bid sizes are sorted in step 352. The lowest intradistrict bid is identified in step 354, and is published in step 356. In steps 358 through 368, the median number of politicians in the auction is calculated.

Figure 13:
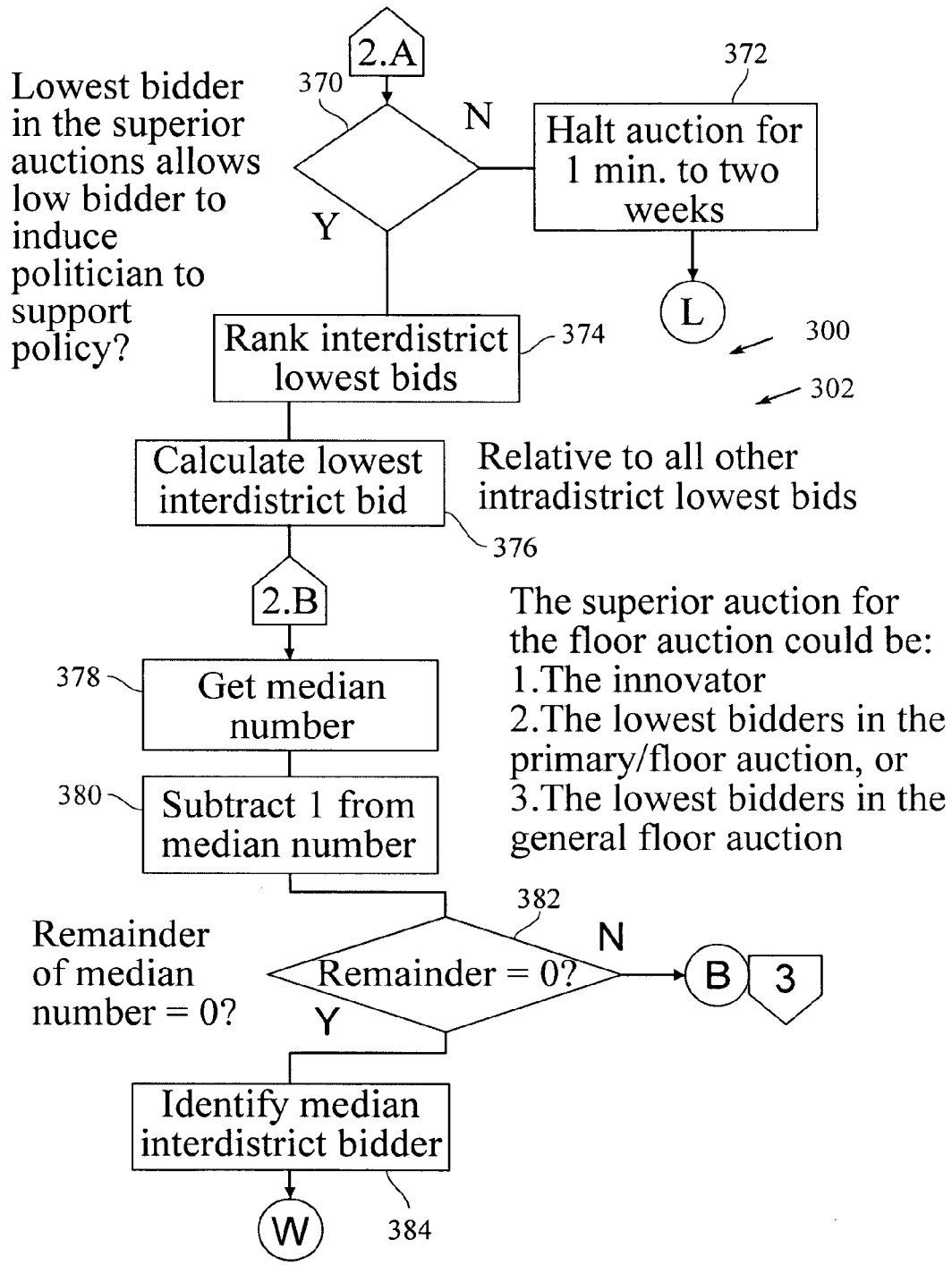

In FIG. 13, if the lowest bidder in the superior auction does not allow the low bidder to induce the politician to support the policy at step 370, the auction is halted for a short time in step 372 before returning. Otherwise, the interdistrict bids are ranked in step 374, and the lowest interdistrict bid is calculated in step 376. The median number from step 368 is entered in step 378, and reduced by one in step 380. If the remainder of the median number is zero at step 382, the median interdistrict bidder is identified in step 384 before repeating the process at step 340.

Figure 14:
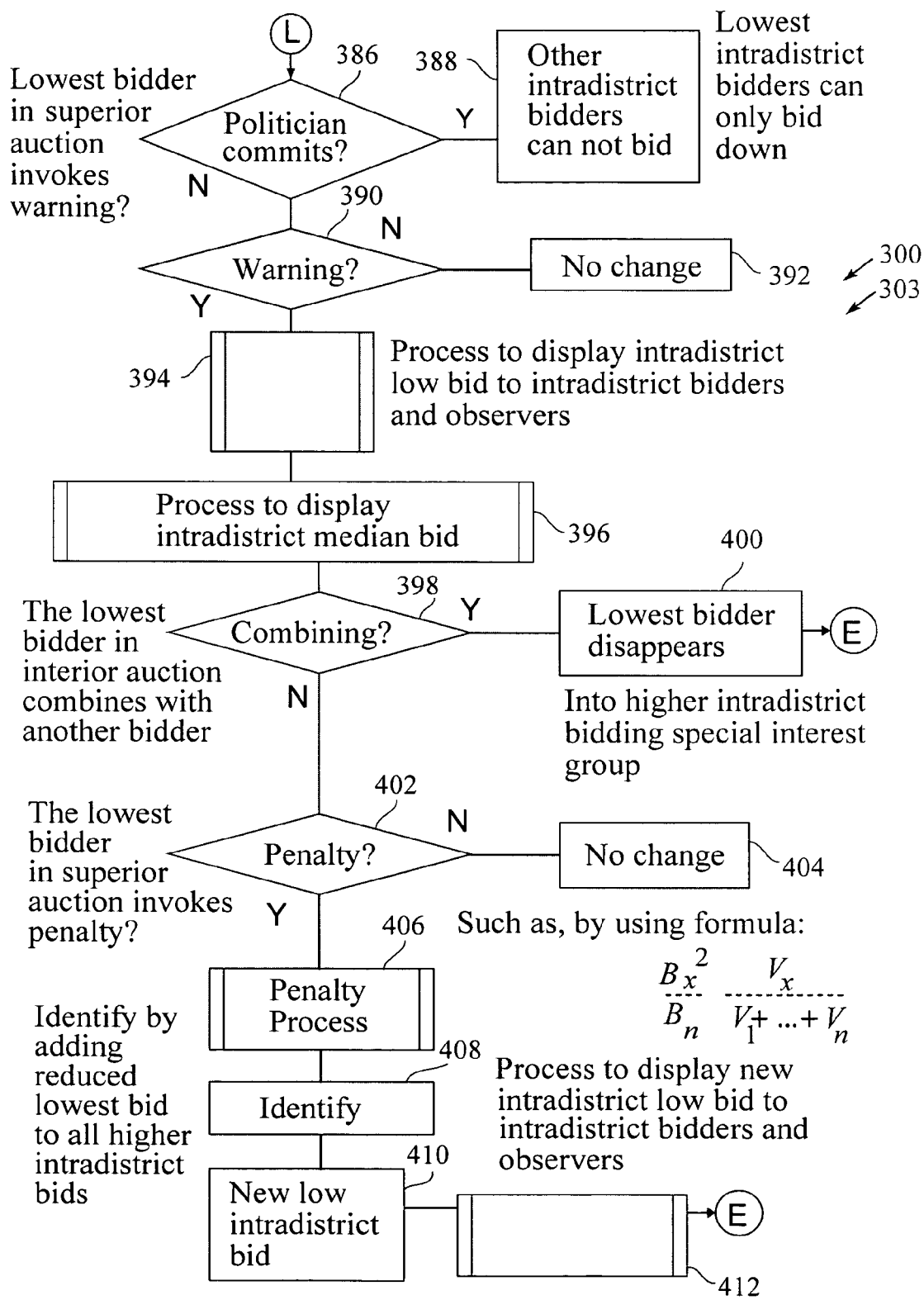
Figure 15:
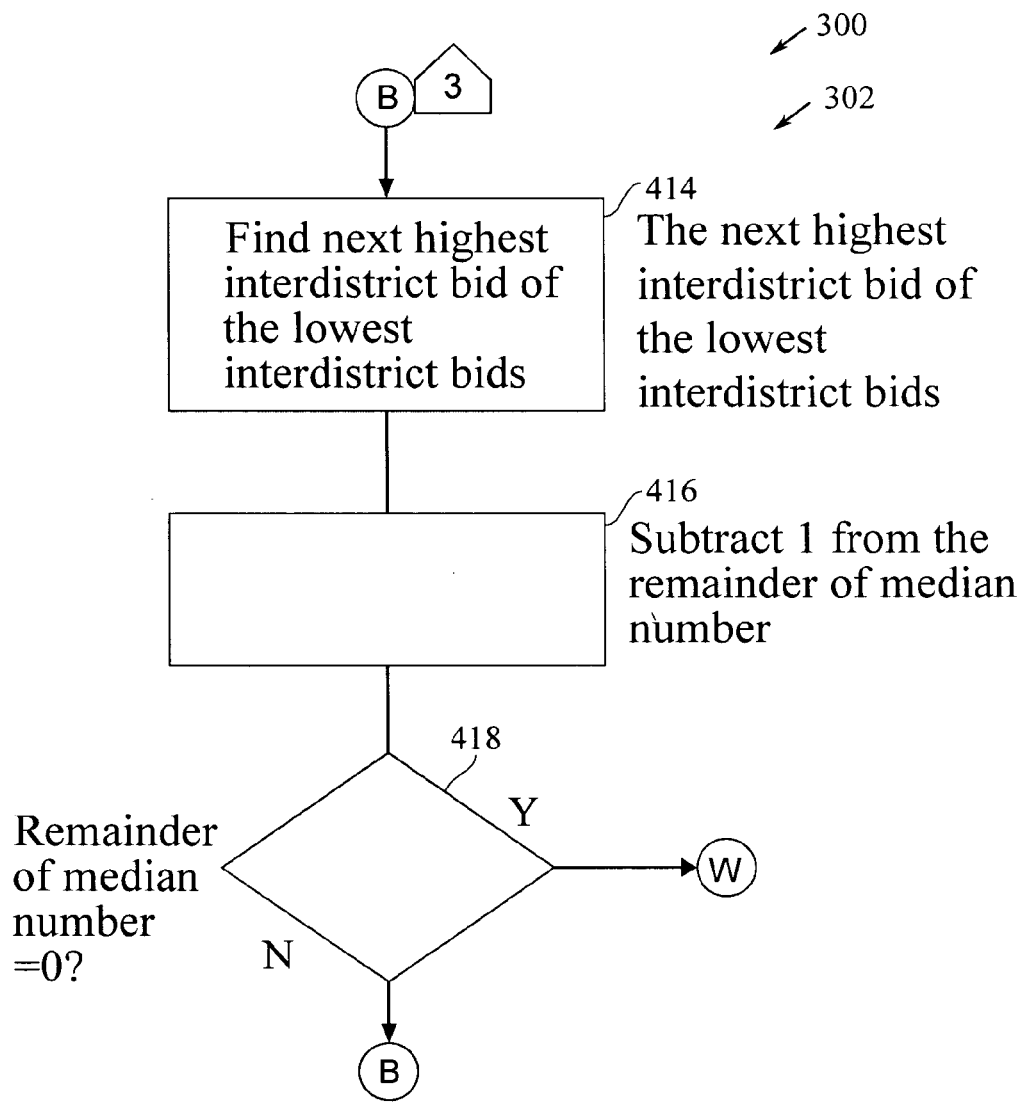

In FIG. 14, if the politician commits to the proposed policy at step 386, only the lowest intradistrict bidders can bid down or up in step 388. Otherwise, if the lowest bidder in the superior auction invokes a warning at step 390, the low bid is published to intradistrict bidders and observers in step 394, and the interdistrict median bid is published in step 396. If the lowest bidder in the present auction combines with another bidder at step 398, that bidder joins that other bidder in step 400 before repeating the process. If the lowest bidder invokes a penalty at step 402, a penalty process is conducted in step 406 and the new lowest intradistrict bid is identified in steps 408 and 410. The new intradistrict low bid is published in step 412 before repeating the process. Now referring to FIG. 15, if the remainder of the median number at step 382 is not zero, the next highest interdistrict bid is identified in step 414, is reduced in step 416, and identified and reduced again until the remainder is zero at step 418.

Figure 16:
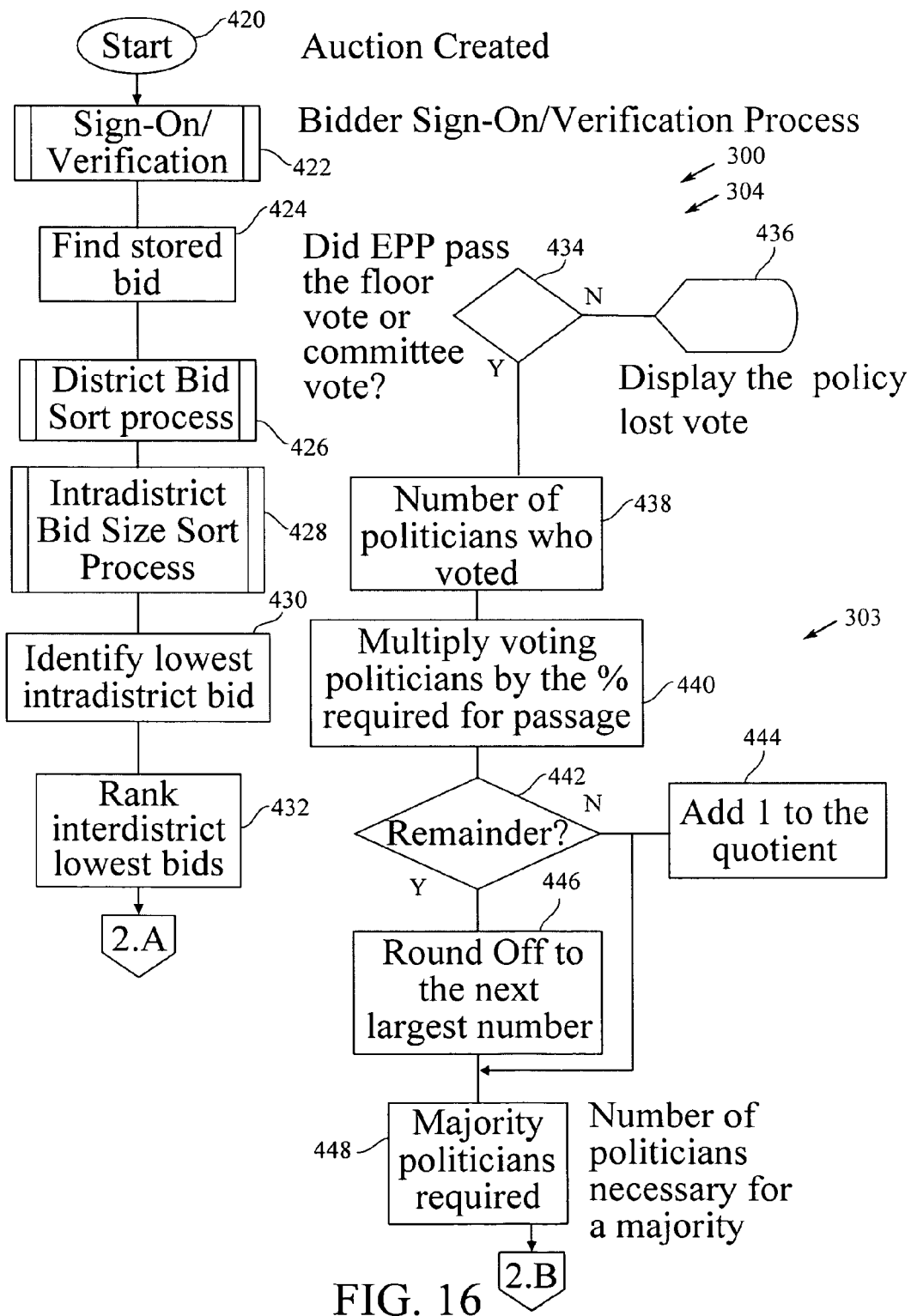
FIGS. 16 through 18 are charts depicting a third real time control process 304 which further comprises the special interest group auction method 300 to determine the winning bidder after a floor or committee vote.
Figure 17:
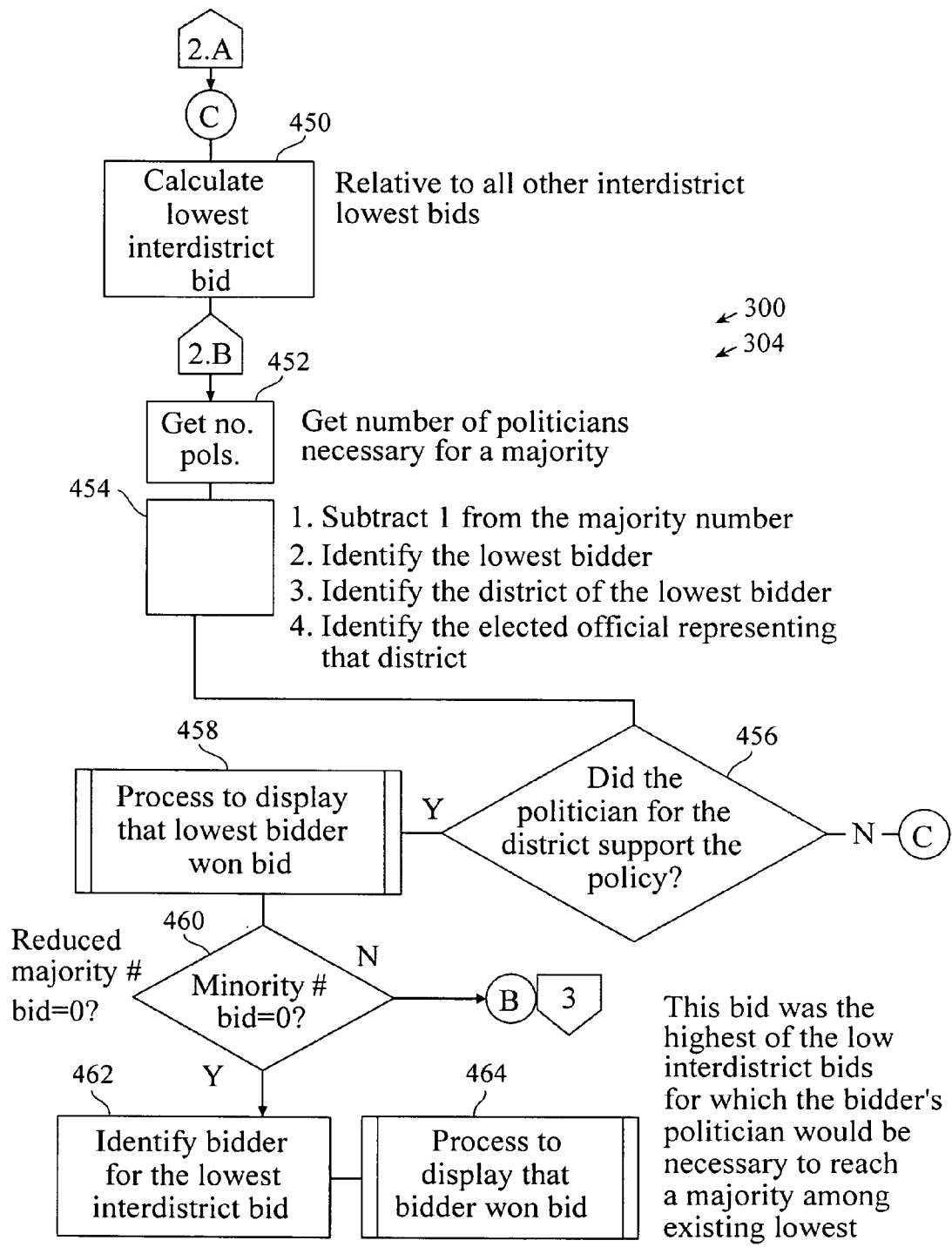
Figure 18:
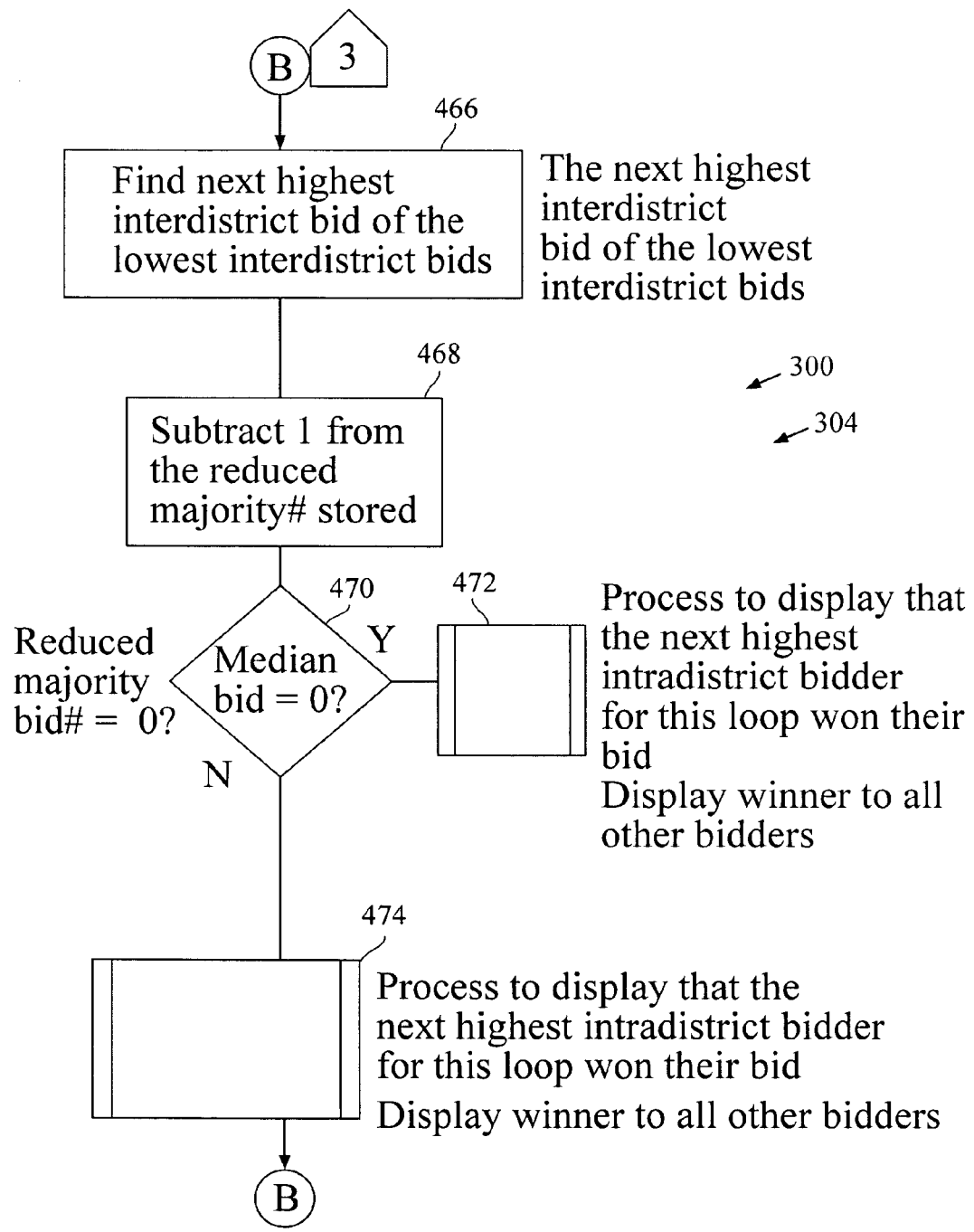

FIGS. 16 through 18 are charts depicting a third real time control process 304 which further comprises the special interest group auction method 300 to determine the winning bidder after a floor or committee vote. This third real time control process begins at step 420 and identifies how to determine the winners of the session level auction. In FIG. 16, the bidder verification method 301 occurs in step 422, and the stored bid is identified in step 424. The district bids (inclusive of combined bids) are sorted in step 426 and the bid sizes are sorted in step 428. The lowest intradistrict bid is identified in step 430 and all the lowest bids are ranked in step 432. If the efficient public policy passes the floor or committee vote at step 434, the minimum number of politicians necessary to pass the legislation is calculated in steps 438 through 448 for reporting in step 452. Otherwise, the loss of the policy vote is published in step 436.

In FIG. 17, the lowest interdistrict bid is calculated in step 450, and in step 452 the number of politicians is identified. A process identifies bidder, district, and politician of the lowest bidder in step 454. If that politician supported the public policy at step 456, the resultant winning bid is published in step 458. If the reduced majority number is not zero, the process continues; otherwise, the lowest bidder is identified in step 462 and displayed in step 464. In FIG. 18, the next highest interdistrict bid remaining is identified in step 466, and the majority number is reduced by one in step 468. Again, if the new majority number is zero at step 470, the winning bid is published in step 472.

5. Special Interest Group Summing Auction Method for Bidders in the Primary and General Election Auctions In another embodiment of the present invention, which is designed to be implemented in collaboration with the second preferred embodiment for bidders in the primary and general election auction, a superior special interest group summing auction method 500 is implemented as a computer application with three tiers: (1) a thin client front end in the form of an Internet World Wide Web (WWW) site, (2) relational database management system (RDBMS) back end of the type prevalent in the art and commercially available, and (3) a middle tier cooperating with the WWW front end and the RDBMS back end. The middle tier contains components that replicate the methods of the present embodiment. Data in the RDBMS tier is shared or pooled with the data of the related auction methods.

Figure 19:
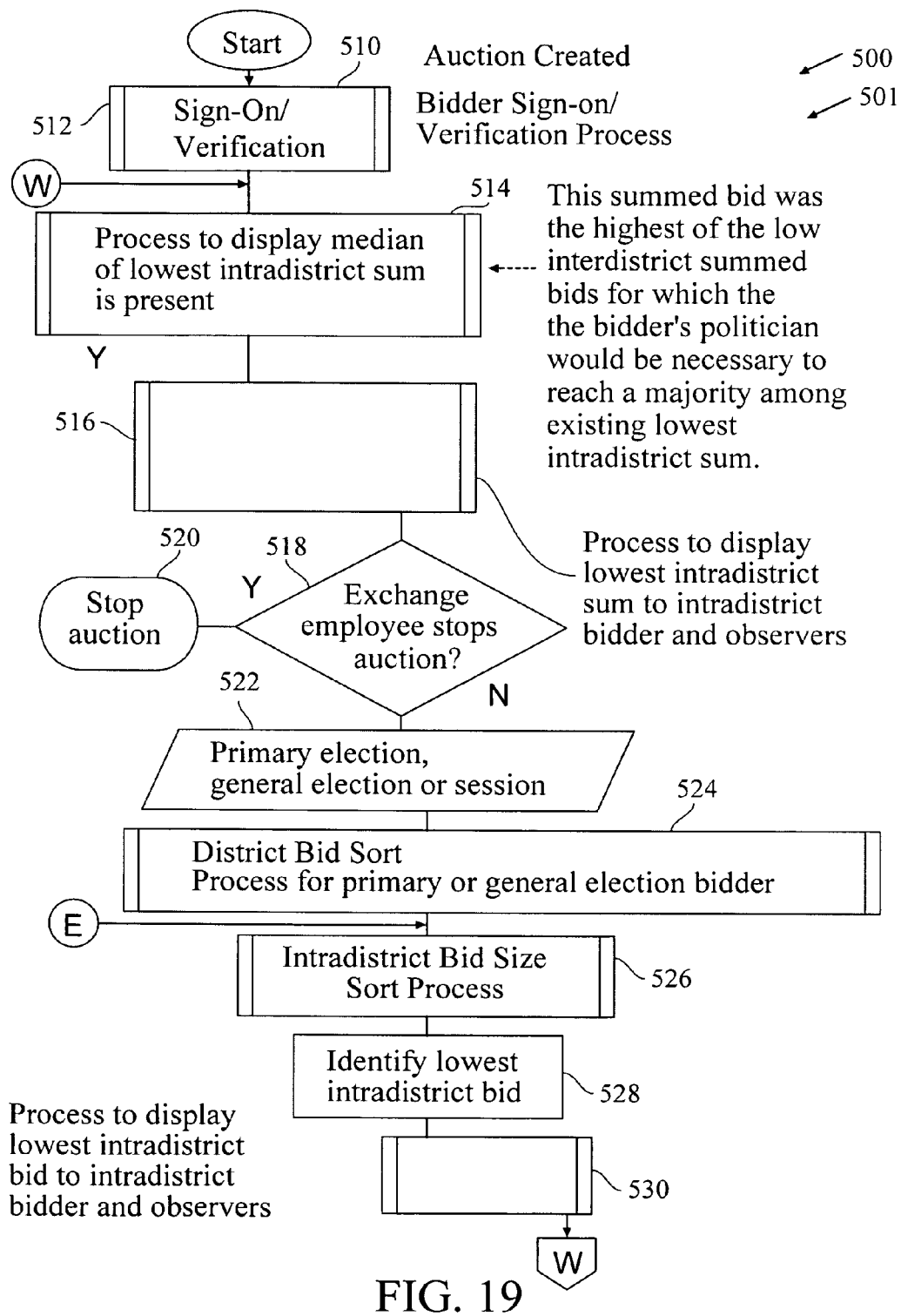
FIG. 19 is a chart depicting a first real time control process 501 which comprises a special interest group summing auction method 500, according to another embodiment of the present invention.

FIG. 19 is a chart depicting a first real time control process 501 which comprises a special interest group summing auction method 500, according to another embodiment of the present invention. This process closely resembles that of first real time control process 301, except that summed bids are identified in step 514, displayed in step 516, and manipulated in the resulting process. This process supports auctions superior to the special interest group auction method 300.

FIGS. 20 through 26 are charts depicting a second real time process 502 for primary and general election bidders during the session level bidding before the floor or committee vote, and third real time control process 503 which further comprises the special interest group summing auction method 500 for determining the winner for the primary and general election bidders after the floor or committee vote.

Figure 20:
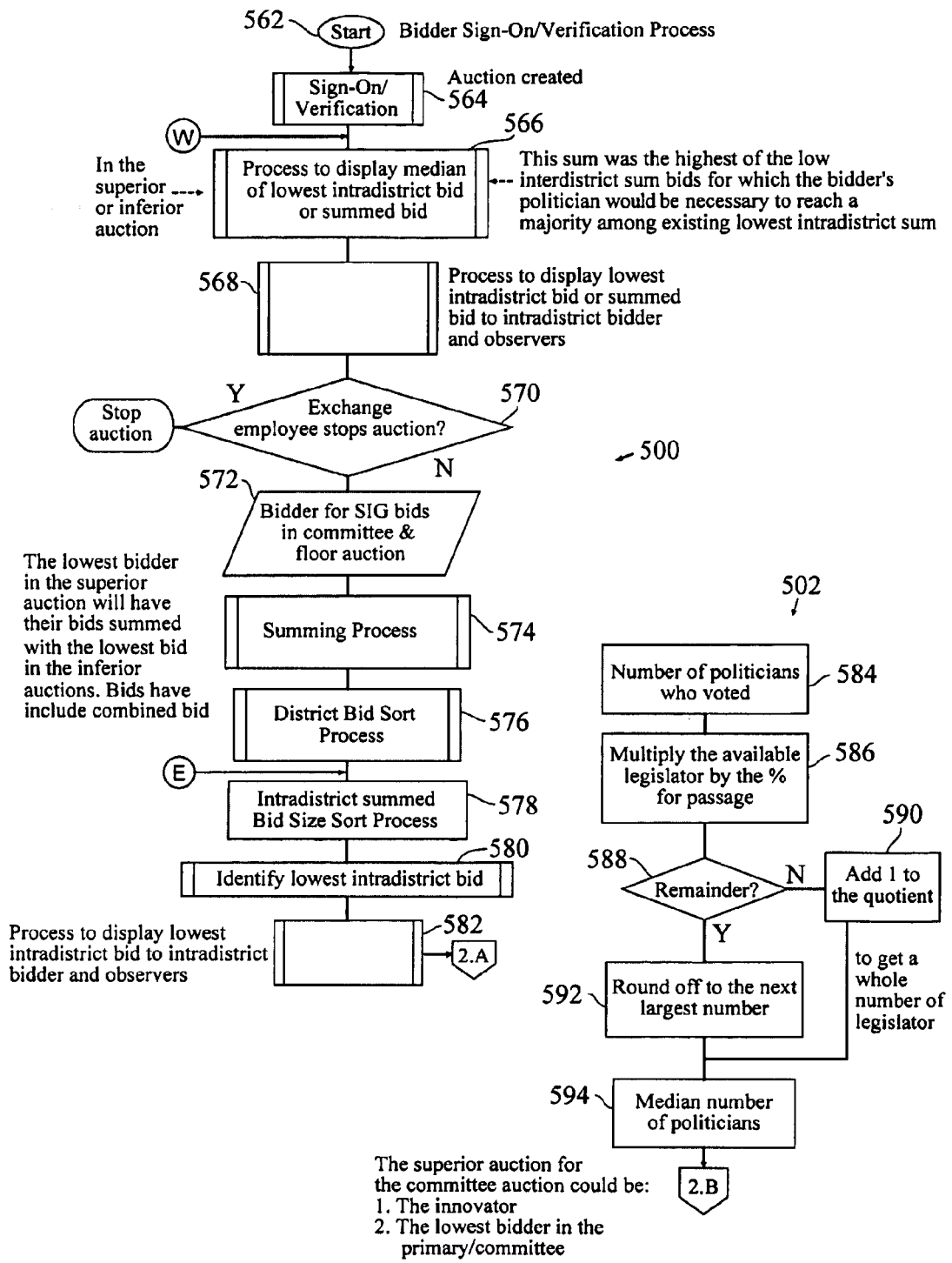
FIGS. 20 through 26 are charts depicting a second real time process 502 for primary and general election bidders during the level bidding before the floor or committee vote, and third real time control process 503 which further comprises the special interest group summing auction method 500 for determining the winner for the primary and general election bidders after the floor or committee vote.

In FIG. 20, a second real time control process begins at step 562 with a bidder verification method analogous to that of FIG. 11. in step 564. The median of the lowest intradistrict summed bids (including the bid of the combined penalized bidders, the combined inferior bidders, and their combined and penalized bids) or in the superior or inferior auction is displayed in step 566 and the lowest intradistrict summed bid is displayed in step 568. If the exchange employee does not stop the auction at step 570, bids are taken in step 572 and are summed in step 574. The summed bids are sorted in step 576 and the summed bid sizes are sorted in step 578. The lowest summed bid is identified in step 580 and published in step 582. The median number of politicians is calculated in steps 584 through 594 for use at step 604.

Figure 21:
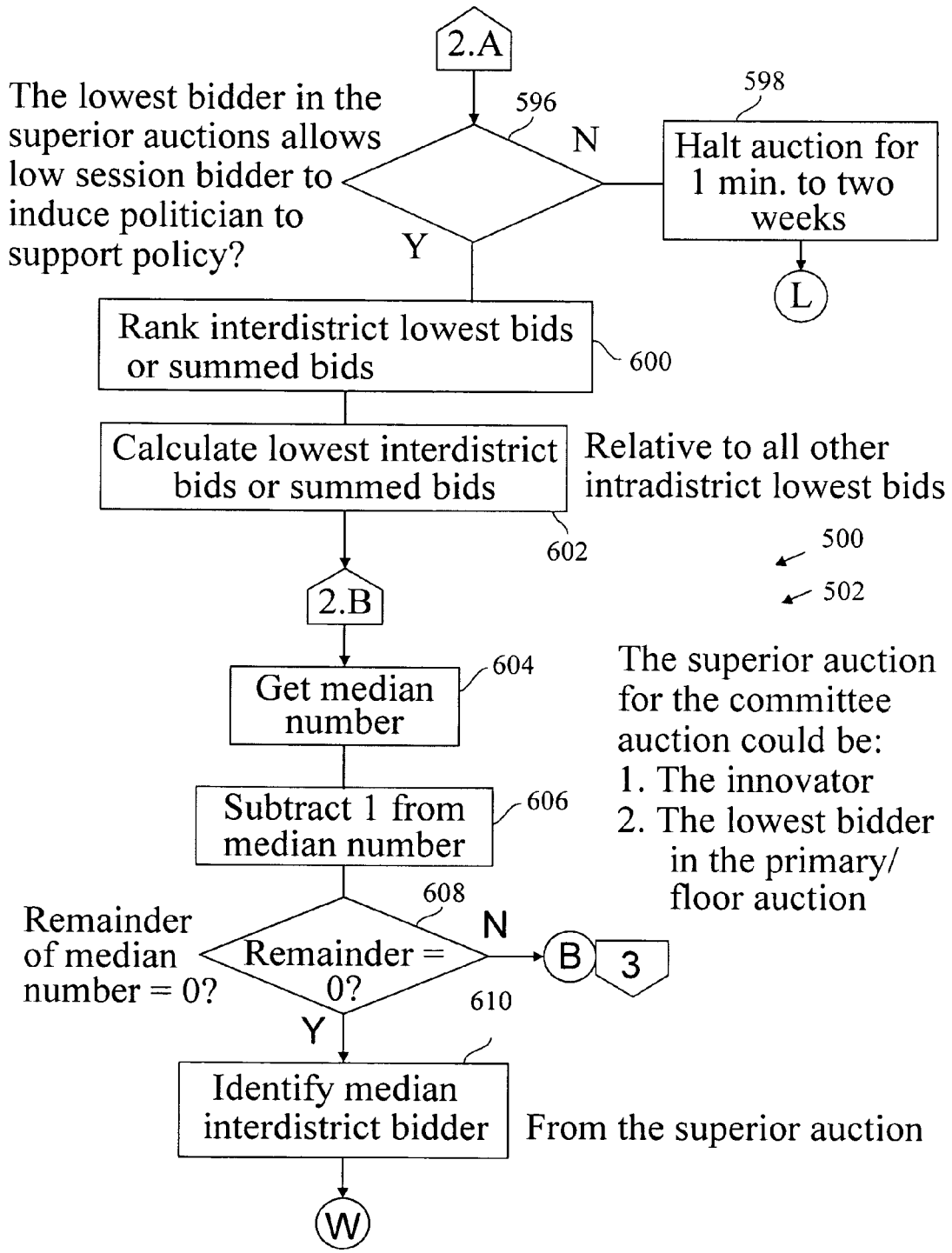

In FIG. 21, if the lowest bidder in the superior auctions does not allow the low bidder in the present auction to induce a politician to support the policy in step 596, the auction is halted for a time in step 598. Otherwise, the interdistrict lowest summed bids are ranked in step 600 and the lowest summed bid is identified in step 602. The minimum number of politicians required to pass the policy is identified in step 604 and reduced by one in step 606. If the remainder of the median number is zero at step 608, the median interdistrict bidder is identified in step 610 before repeating the process.

Figure 22:
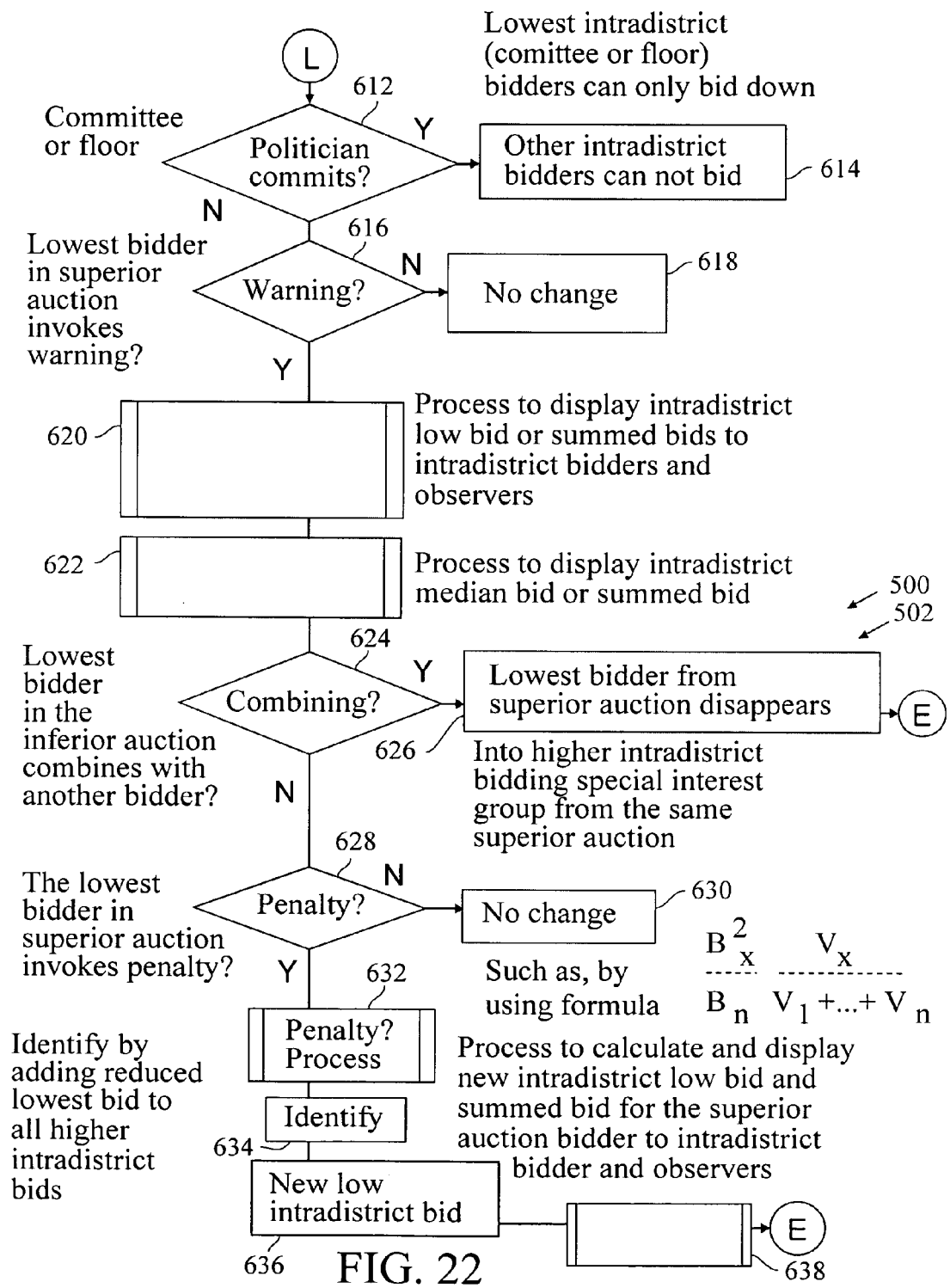

In FIG. 22, if the politician commits to the proposed policy at step 612, only the lowest intradistrict bidders can bid up or down in step 614. Otherwise, if the lowest bidder in the superior auction invokes a warning at step 616, the low bid is published to intradistrict bidders and observers in step 620, and the interdistrict median bid is published in step 622. If the lowest bidder in the present auction combines with another bidder at step 624, that bidder joins that other bidder in step 626 before repeating the process. If the lowest bidder invokes a penalty at step 628, a penalty process is conducted in step 406 and the new lowest intradistrict bid is identified in steps 632 and 634. The new intradistrict low bid is published in step 636, and the new low bid and summed bid for the superior auction are calculated and published in step 638, before repeating the process.

Figure 23:
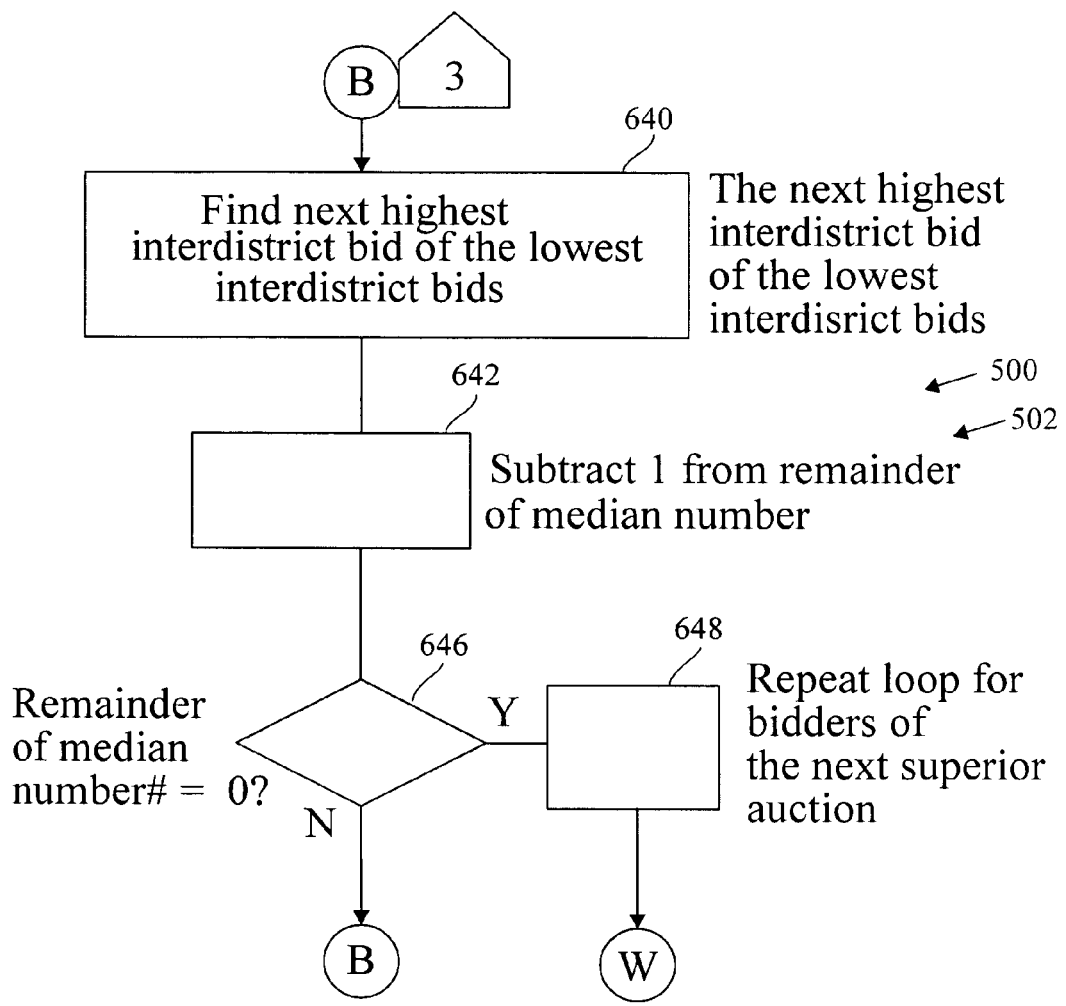

Now referring to FIG. 23, if the remainder of the median number at step 608 is not zero, the next highest interdistrict bid is identified in step 640, is reduced in step 642, and identified and reduced again until the remainder is zero at step 646. In the present auction method, the loop is then repeated for bidders of the next superior auction in step 648.

Figure 24:
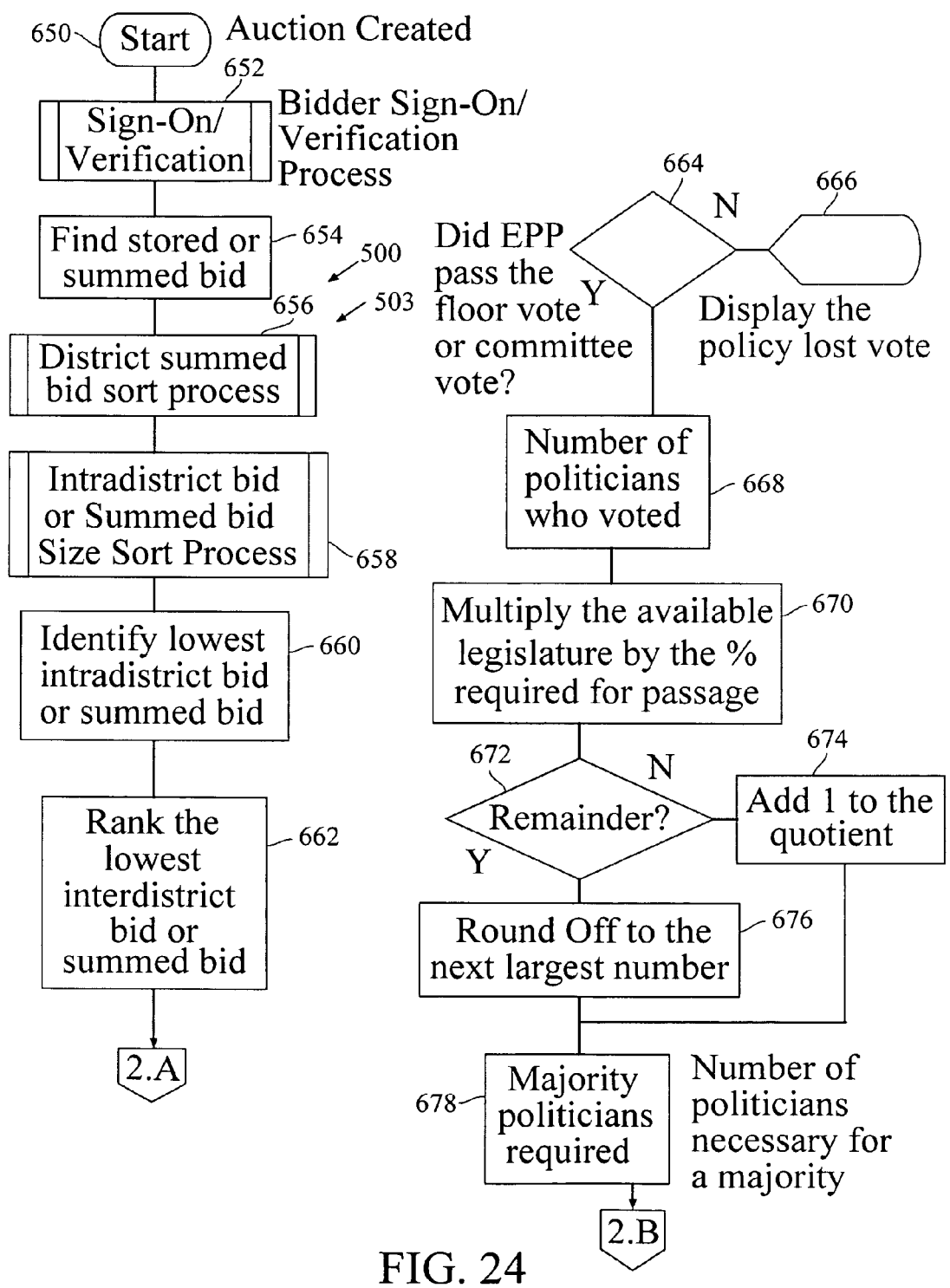

The third real time control process 503 which further comprises the special interest group summing auction method 500 closely resembles the third real time control process 304 which further comprises the special interest group auction method 300. This process begins at step 650 and identifies the winner of the auction. In FIG. 24, the bidder verification method 301 occurs in step 652, and the stored bid is identified in step 654. The district bids are sorted in step 656 and the bid sizes are sorted in step 658. The lowest intradistrict bid is identified in step 660 and all the lowest bids are ranked in step 662. If the efficient public policy passes the floor or committee vote at step 664, the minimum number of politicians necessary for the policy to pass is calculated in steps 668 through 678 for reporting. Otherwise, the loss of the policy vote is published in step 666.

Figure 25:
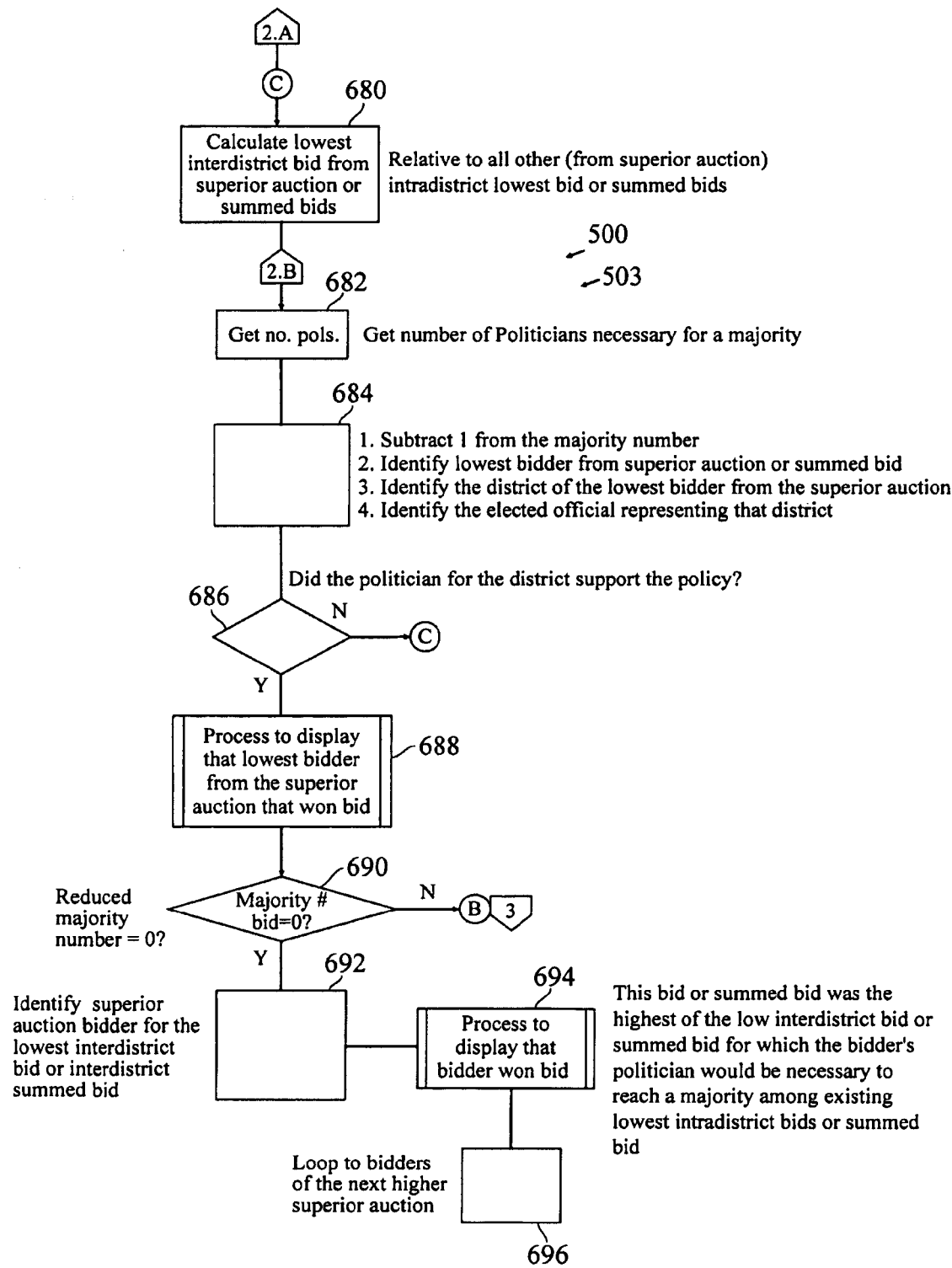
Figure 26:
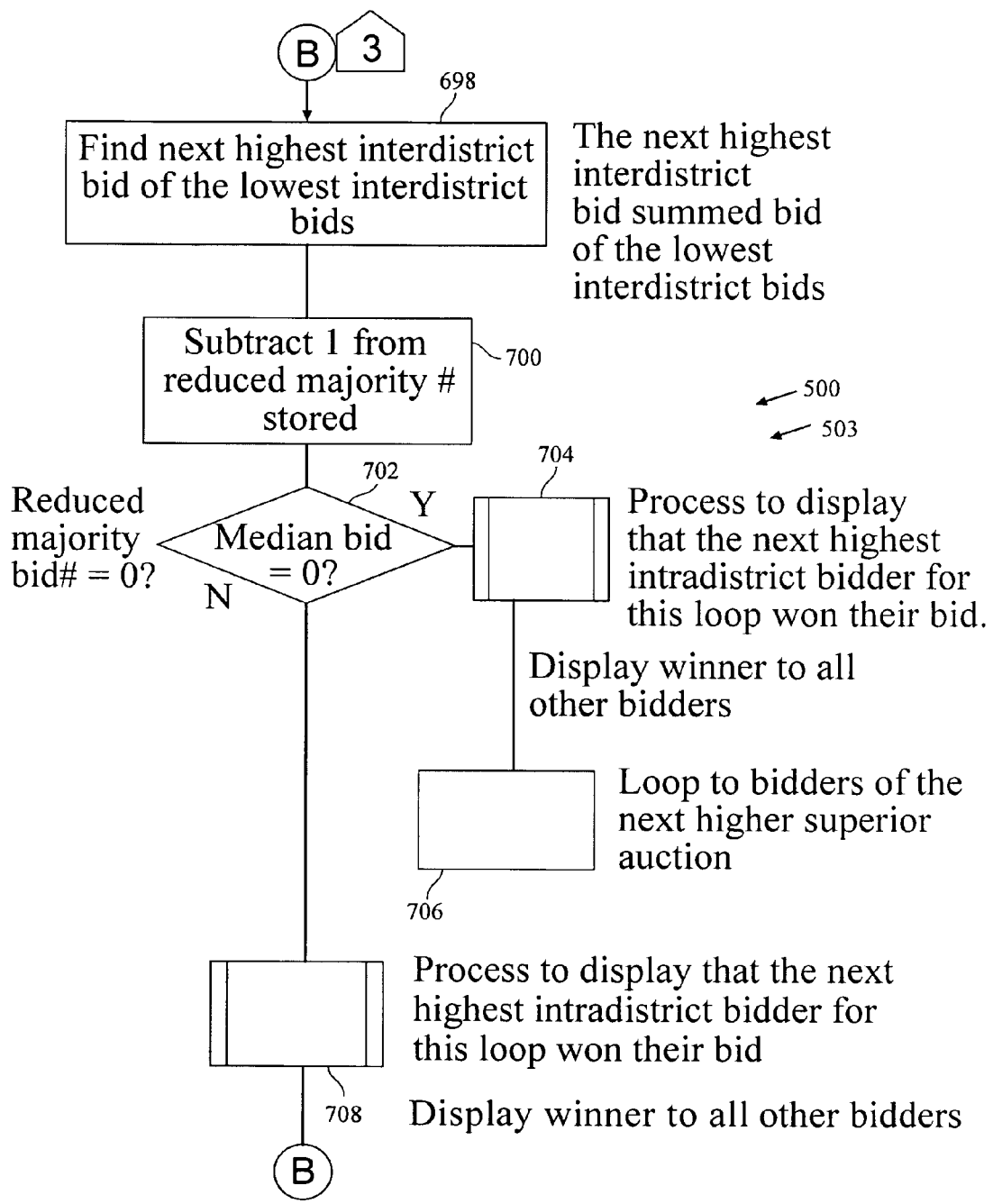

In FIG. 25, the lowest interdistrict summed bid (inclusive of the combined and penalized bidders and the superior and inferior low bidders) is calculated in step 680, and in step 682 the number of politicians is identified. A process identifies bidder, district, and politician of the lowest bidder in step 684. If that politician supported the public policy at step 686, the resultant winning bid from the superior auction is published in step 688. If the reduced majority number is not zero, the process continues; otherwise, the lowest bidder is identified in step 692 and displayed in step 694. This process loops to the bidders of the next higher superior auction in step 696. In FIG. 26, the next highest interdistrict bid remaining is identified in step 698, and the majority number is reduced by one in step 700. Again, if the new majority number is zero at step 702, the winning bid is published in step 704.

Although the present invention has been disclosed in terms of preferred embodiments, it will be understood that numerous variations and modifications could be made without departing from the scope of the invention as set forth in the following claims. For example, the enterprise under which the present invention can be practiced can be a corporate governance or association governance instead of a political one. In this manner, any enterprise can serve as the governmental entity, and any elected or appointed officer can serve as the politician. By way of further example, the communications medium connecting the computer clients of innovators, special interest groups, politicians, and governmental enterprises can be a dedicated network or Intranet, instead of the Internet. It is to be understood, therefore, that the invention may be practiced otherwise than as specifically set forth in the appended claims.

I claim:

1. A computer-based method and system for providing citizens a financial incentive for the development and legislative adoption of new efficient public policies, comprising the steps of:
   registering the policies of a plurality of innovators;
   estimating the relative approximate savings of the efficient policies of said innovators using conciliation and arbitration;
   allocating relative shares of a distribution of the relative approximate savings of the policies of said innovators;
   auctioning off the relative shares of the distribution of the relative approximate savings of the policies of said innovators.

2. The computer-based method for providing citizens a financial incentive for the development and legislative adoption of new efficient public policies according to claim 1, wherein said step of estimating the relative approximate savings of the efficient policies of said innovators further comprises the steps of calculating an amount of savings to be gained from said efficient public policy if adopted by a subscriber's jurisdiction, and conducting a second auction of a percentage of said savings to constituents whose legislators reach the minimum number to pass the public policy.

3. The computer-based method for providing citizens a financial incentive for the development and legislative adoption of new efficient public policies according to claim 2, wherein said second auction is conducted to a group of constituents defined by political voting district, legislative seat, or individual legislator.

4. The computer-based method for providing citizens a financial incentive for the development and legislative adoption of new efficient public policies according to claim 3, wherein a second auction to a group of constituents (defined registration in a primary election and a contribution to a candidate during the primary election) is superior to a second auction group of constituents (defined by registration in a general election and a contribution to a candidate during the general election), which is superior to a second auction to a group of constituents (defined by registration in the session auction).

5. The computer-based method for providing citizens a financial incentive for the development and legislative adoption of new efficient public policies according to claim 4, wherein said step of estimating the relative approximate savings of the efficient policies of said innovators further comprises determining whether another innovator could had developed the public policy less than twenty years after the initial innovator developed the policy, and if so establishing a predetermined interval of time before additional innovators may participate.

6. The computer-based method for providing citizens a financial incentive for the development and legislative adoption of new efficient public policies according to claim 5, further comprising the step of calculating a share of the initial research and development expense to be borne by said addition innovators.

7. The computer-based method for providing citizens a financial incentive for the development and legislative adoption of new efficient public policies according to claim 6, further comprising the step of requiring an additional innovator to wait said negotiated and arbitrated interval of time and to then pay said share of research and development expense to participate in the auction.

8. A computer-based method for providing citizens a financial incentive for the development and legislative adoption of new efficient public policies comprising the steps of:
   registering policies developed by innovators;
   negotiating with conciliation or arbitrating with penalties to determine the relative contribution of said innovators and how soon they can attain compensation for their relative contribution.

9. The computer-based method for providing citizens a financial incentive for the development and legislative adoption of new efficient public policies according to claim 8, further comprising the steps of calculating an amount of savings to be gained from said public policy if adopted in a subscriber's jurisdiction.

10. The computer-based method for providing citizens a financial incentive for the development and legislative adoption of new efficient public policies according to claim 9, further comprising the step conducting an auction of said policy to subscribers who are represented by a minimum number of legislators sufficient to pass the public policy.

11. The computer-based method and system for providing citizens a financial incentive for the development and legislative adoption of new efficient public policies according to claim 10, wherein said auction is conducted to a group of subscribers selected in accordance with political voting district, legislative seat, or individual legislator.

12. The computer-based method for providing citizens a financial incentive for the development and legislative adoption of new efficient public policies according to claim 11, further comprising a series of session-level of auctions to constituents.

13. The computer-based method for providing citizens a financial incentive for the development and legislative adoption of new efficient public policies according to claim 12, wherein said second series of auctions is hierarchical and further includes a superior auction to a first group of constituents who have registered to vote in a primary election and contributed to a candidate in the primary election, and an inferior auction to a second group of constituents who have registered to vote in a general election and have made a contribution to a candidate in the general election.

14. The computer-based method for providing citizens a financial incentive for the development and legislative adoption of new efficient public policies according to claim 13, further comprising a step of charging said subscriber a penalty if all of said innovators withdraw their bids.

\* \* \* \* \*